(12) United States Patent
Kamio

(10) Patent No.: US 7,671,830 B2
(45) Date of Patent: Mar. 2, 2010

(54) ELECTRONIC APPARATUS WITH DISPLAY DEVICE

(75) Inventor: Tomomi Kamio, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 1207 days.

(21) Appl. No.: 11/128,139

(22) Filed: May 11, 2005

(65) Prior Publication Data
US 2005/0253799 A1 Nov. 17, 2005

(30) Foreign Application Priority Data
May 12, 2004 (JP) ............................. 2004-142201

(51) Int. Cl.
*G09G 3/36* (2006.01)
(52) U.S. Cl. ........................... 345/96; 345/1.2; 345/209
(58) Field of Classification Search ........... 345/1.1–3.4, 345/100, 87, 204, 30, 40, 42, 51, 55, 79, 345/209
See application file for complete search history.

(56) References Cited
U.S. PATENT DOCUMENTS

| 5,748,165 | A | | 5/1998 | Kubota et al. | |
|---|---|---|---|---|---|
| 5,907,314 | A | | 5/1999 | Negishi et al. | |
| 6,084,562 | A | * | 7/2000 | Onda | 345/94 |
| 7,167,141 | B2 | * | 1/2007 | Goto et al. | 345/1.1 |
| 7,268,746 | B2 | * | 9/2007 | Yoshida | 345/1.1 |
| 7,301,509 | B2 | * | 11/2007 | Yun et al. | 345/1.3 |
| 7,330,163 | B2 | * | 2/2008 | Nakai et al. | 345/1.1 |
| 2003/0080932 | A1 | | 5/2003 | Konno et al. | |
| 2004/0021616 | A1 | | 2/2004 | Goto et al. | |
| 2004/0027315 | A1 | | 2/2004 | Senda et al. | |
| 2004/0140947 | A1 | | 7/2004 | Tsuyuki et al. | |
| 2004/0169618 | A1 | | 9/2004 | Nakai et al. | |
| 2005/0253799 | A1 | * | 11/2005 | Kamio | 345/103 |

FOREIGN PATENT DOCUMENTS

| EP | 1 389 775 A2 | 2/2004 |
|---|---|---|
| EP | 1 406 240 A2 | 4/2004 |
| JP | 2003-323164 A | 11/2003 |

\* cited by examiner

*Primary Examiner*—Amr Awad
*Assistant Examiner*—Tony Davis
(74) *Attorney, Agent, or Firm*—Frishauf, Holtz, Goodman & Chick, P.C.

(57) ABSTRACT

Two display panels constituted at least by having a plurality of scanning lines and signal lines with display pixels situated near each intersecting point of each scanning line and signal line besides a common electrode situated in common with each of the display pixels and the display panels having a predetermined numbers of the scanning lines respectively. While repeating alternately between each of the display panels in a display period within a one frame period, an operation sequentially selects a number of the scanning lines of each of these display panels corresponding to the ratio of the numbers of the scanning lines in each of these display panels at predetermined scan timing. Reversal control of the signal polarity of each common signal voltage is applied to the common electrode of each display panel so that reversal drive of each display panel is performed for every scanning line and frame period.

29 Claims, 9 Drawing Sheets

ELECTRONIC APPARATUS WITH DISPLAY DEVICE

CROSS-REFERENCE TO RELATED APPLICATION

This application is based upon and claims the benefit of priority from the prior Japanese Patent Application No. 2004-142201, filed May 12, 2004, the entire contents of which is incorporated herein by reference.

BACKGROUND OF THE INVENTION

1. Field of the Invention

The present invention relates to a display device and an electronic apparatus comprising the display device and drive control method for the display devices. More particularly, the present invention relates to an electronic apparatus, for example a cellular telephone (cell-phone), portable telephone, etc. comprising a display device and associated display device comprising two or more display panels and a drive control method thereof.

2. Description of the Related Art

During the last decade, proliferation of digital information equipment, such as personal computers, digital cameras, cellular telephones, DVD recorders, etc. has been unprecedented. In such digital information equipment, a display device is supplied for displaying various kinds of image information, the current operational state, etc.

For instance, at present the majority of cellular telephones have evolved into a foldable type case structure (clamshell-type) Also, many mainstream cellular telephone handsets of this style comprise two display panels installed back to back in the upper portion of the telephone: a relatively large main display formed in the primary operation functions surface side facing inwards (case inner surface) and a comparatively smaller sub-display that faces outwards (case outer surface).

Here, a conventional prior art display device comprised with two display panels will be explained.

FIG. 7 is an outline configuration diagram showing an example of a conventional prior art display device comprised with two display panels.

As seen in FIG. 7 and like the above-mentioned cellular telephone, this configuration is comprised with a relatively large main display and a comparatively smaller sub-display. Also, the configuration illustrates two display panels in which the display pixels are arranged in a two-dimensional array and applied to a liquid crystal display panel corresponding to an active-matrix driving method.

The conventional prior art display device, for example as shown in FIG. 7, has a configuration comprised with at least two varieties of display panels PNL1, PNL2 arranged in parallel with a different number of scanning lines; a gate driver GDR (scanning driver) which sequentially applies a scanning signal to each scanning line group SLm, SLs arranged in the row direction of each display panel PNL1, PNL2; a source driver SDR (data driver) which applies a display signal (for example, display signal voltage corresponding to a luminance signal) to the data line group DLm arranged in the column direction of the display panel PNL1; and common voltage generation sections COM1, COM2 (common electrode driver section) which apply a common signal voltage Vcom1, Vcom2 to a common electrode (omitted from diagram) provided in each display panel PNL1, PNL2.

Here, for example, the two display panels PNL1, PNL2 are different in panel size. In the configuration among the data line group DLm which extends from the source driver SDR in the display panel PNL1, a portion of the data line group DLs passes through the display panel PNL1 and leads to the display panel PNL2. Basically, in this arrangement the data line group DLs is shared by the two display panels PNL1, PNL2. For instance, an example is shown in FIG. 7. In the display panel PNL1 the number of scanning lines is 240 and the number of data lines is 528 (176×3 (RGB)). In the display panel PNL2 the number of scanning lines is 64 and the number of data lines is 264 (88×RGB). Among the data line group DL1~DL528 which extend from the source driver SDR, the data line group DL1~DL264 has a configuration shared by the two display panels PNL1, PNL2.

Also, in the display device shown in FIG. 7 for example even though a configuration in the case of two different panel sizes (the number of scanning lines) is illustrated, the display device may also be comprised of two display panels of the same panel size.

Furthermore, as seen in FIG. 7, the gate driver GDR has a single driver chip structure, but it can also have a distinct driver chip structure corresponding to each scanning line group SLm, SLs arranged in the display panels PNL1, PNL2. Specifically, the structure has to be able to apply a sequential scanning signal to all of the scanning lines in plural stages by way of the shift signal generation component provided in the gate driver GDR.

Moreover, the common voltage generation sections COM1, COM2 apply common signal voltages Vcom1, Vcom2 to the common electrode of each display panel PNL1, PNL2 and as seen in FIG. 7 may have a configuration formed separately so as to correspond to each of the display panels PNL1, PNL2. On the other hand, separate common signal voltages Vcom1, Vcom2 may also be applied to each display panel PNL1, PNL2 from a single common voltage generation section.

FIG. 8 is a timing chart showing an example of the display drive control method in a conventional prior art display device.

The display drive control method in the above-mentioned display device, for example as shown in FIG. 8 exemplifies 1vertical scanning period of 1 frame period. Initially, scanning drive for the scanning signals S1~S64 is sequentially applied from the gate driver GDR to the scanning line group SLs (SL1~SL64) of the display panel PNL2 used for the smaller panel size. As this timing synchronizes and after supplying the display signals D1~D264 from the source driver SDR to the data line group DLs (DL1~DL264) corresponding to each row of the display panel PNL2 and writing the display pixels of each row, subsequent scanning drive for the scanning signals S65~S304 is sequentially applied to the scanning line group SLm (SL65~SL304) of the display panel PNL1 used for the larger panel size. As this timing synchronizes and by supplying the display signals D1~D528 from the source driver SDR to the data line group DLm (DL1~DL528) corresponding to each row of the display panel PNL1 and writing the display pixels of each row, the desired image information is displayed on each of the display panels PNL1 and PNL2. Specifically, in the display drive control method shown in FIG. 8, after writing the display data to the display panel PNL2, a series of display drive control operations is sequentially performed which writes the display signal to the display panel PNL1 in 1 frame period as 1 cycle. Accordingly, within a 1 frame period, separate operation periods (individual display periods) perform the display drive of each display panel PNL1, PNL2 in chronological order (serial).

Furthermore, in the display drive control method shown in FIG. 8 the display signal is sequentially written to the display panels PNL2 and PNL1 in a 1 frame period of 1 cycle. This case example is implemented with a frame reversal drive method (also commonly known as a frame-inversion drive method) which performs reversal control of the signal polarity (polarity reversal) in the common signal voltage Vcom (Vcom1, Vcom2) for every 1 frame period. As is generally known in such a frame reversal drive method, the voltage polarity applied to the liquid crystal molecules (pixel capacitance) of the display pixel configuration readily produces degeneration of the liquid crystals or seizing, the display image quality tends to deteriorate by flickering, etc. as a result of being maintained at a specific polarity for a relatively lengthy interval of a 1 frame period. Therefore, as a display drive control method for controlling such phenomena in addition to the frame reversal drive method, a line (row) reversal drive method (also commonly known as row-inversion drive method) is applied in many cases which reverses (inverts) the signal polarity of the common signal voltage for each scanning line.

FIG. 9 is a timing chart showing a case of performing display drive with a conventional prior art display device by line reversal drive method and frame reversal drive method.

Here, with regard to the above comparative relationship with the embodiments of the present invention described later, a case will be explained in which after the display signal is written to the display panel PNL1, the display signal is written to the display panel PNL2 in a 1 frame period of the display device shown in FIG. 7. Also, while having 320 scanning lines for the display panel PNL1 and 160 scanning lines for the display panel PNL2, this instance consists of the same number of data lines.

Specifically, as shown in FIG. 9 for example, first in the PNL1 display available period within a 1 frame period and by way of the gate driver GDR, after scanning from the $1^{st}$ row thru the $320^{th}$ row in the display panel PNL1, the PNL2 display available period from the $1^{st}$ row thru the $160^{th}$ row is scanned in the display panel PNL2. Also, while the display signal is simultaneously supplied via the data lines by way of the source driver SDR and synchronizing with the scan timing T1, T2, . . . , T480 (horizontal scanning period) of each row (scanning lines), reversal control of the signal polarity for the common signal voltages Vcom1, Vcom2 is carried out for each scan timing of each row. Furthermore, reversal control of the signal polarity (polarity reversal) in the relevant common signal voltages Vcom1, Vcom2 is performed for every 1 frame period. Accordingly, the number of scanning lines in the common signal voltages Vcom1, Vcom2 together constitute substantially 480 lines (=320 lines+160 lines) which represent the total number of scanning lines in each display panel PNL1, PNL2. The reversal drive performed in the display panels during driving cycles (frequency rate of repetition) is equivalent to the cases of line reversal drive and frame reversal drive. In addition as seen in FIG. 9, BP (back portion) is a non-display period from vertical synchronization timing (start timing of a 1 frame period) to a display available period of the display panel PNL1. MP (middle portion) is a non-display period from a display available period of the display panel PNL1 to a display available period of the display panel PNL2. FP (front portion) is a non-display period from a display available period of the display panel PNL2 to the next vertical synchronization timing and indicates what is known as a vertical retrace line period.

Parenthetically, in a cellular telephone which has two display panels, an image can only be viewed on one of the display panels (for example, the main display) at a time and nothing can be viewed on the other side display panel (for example, the sub-display) because the opposite side display panel is shifted to a non-display state. In this case, each display panel is set to a line reversal drive and a frame reversal drive method even though one of the display panels is actuated in a display state and the display panel on the opposite side is shifted to a non-display state. The reversal drive of the common signal voltage applied to the common electrode of the display panel in a non-display state cannot be discontinued. Thus, it is essential to maintain the reversal drive of the common signal voltage applied constantly to the common electrode of both display panels.

In order to lower power consumption in the display panel of the opposite direction in a non-display state, when reversal drive of the common signal voltage supplied to the common electrode of the relevant display panel is discontinued, the electric charge stored in the display pixels in the previous display state leaks gradually via an electrostatic protection device. As a result, streak-like "noise" may be generated in the display screen in proportion to the amount of variation of this leak and the display state becomes distorted (smeared). Also, based on the electric charge stored in the display pixels, the liquid crystals tend to deteriorate by continuously applying constant polarity voltage to the liquid crystal molecules for a relatively lengthy period.

Thus, in a display device which has two display panels, even if the display panel of one direction is actuated in a display state and the display panel of the opposite direction is shifted to a non-display state, common signal voltage is always applied to both display panels. Since it is necessary to perform reversal drive by predetermined cycles for reversal drive control of the common signal voltage, there is a drawback in that power consumption increases.

SUMMARY OF THE INVENTION

The present invention of an electronic apparatus comprises a plurality of display panels and comprises display devices which display an image corresponding to a display signal. The present invention has the advantage of being able to achieve a reduction in the power consumption related to reversal drive in each display panel.

The display device in the present invention for acquiring the above-mentioned advantage comprises at least a plurality of display panels which comprise a plurality of scanning lines and a plurality of signal lines with display pixels situated near each intersecting point of each scanning line and signal line besides a common electrode situated in common with each of the display pixels; the display panels having a predetermined numbers of the scanning lines respectively; a scan driver section which sequentially applies a scanning signal to each of the plurality of scanning lines in each of the plurality of display panels and sequentially set the display pixels corresponding to the appropriate scanning lines as a selective state; and a control section which controls operation for sequentially selecting a number of the scanning lines of each of the plurality of display panels corresponding to the ratio of the numbers of the scanning lines in each of the plurality of display panels at every predetermined scan timing by the scan driver section and for repeating uniform sequences between each of the display panels in a display period at a plurality of times within a one frame period.

The display period comprises a vertical scanning period required for shifting the number of scanning lines of each display panel entirely to a selective state.

The display device further comprises a common electrode driver section to a common electrode for each display panel which applies a common signal voltage for setting a voltage level in respective common electrodes; and the control section at least performs reversal control of the signal polarity relative to each of the display panels for each of the common signal voltages applied to the common electrode in each of the display panels by the common electrode driver section so that reversal drive for every scanning line and every frame period corresponds to a selection operation for each of the scanning lines by the scan driver section.

Also, the control section is set to a period which selects the scanning lines of anyone of the display panels in the plurality of display panels by the scan driver section, the signal polarity of the common signal voltage applied to the common electrode of whichever other of the display panels selected next by the common electrode driver section is set as the same polarity as the signal polarity of the common signal voltage applied to the common electrode of the relevant display panel when the scanning lines of the next relevant display panel are selected; performs reversal control of the signal polarity for each of the common signal voltages so that a sum total applied time period for each signal polarity of the common signal voltage applied to the common electrode in each of the display panels becomes equal in the display period; and the reversal frequency in a display period within a one frame period of the signal polarity for the common signal voltage applied to the common electrode of each of the display panels is set to the same total as the number of scanning lines of each these display panels.

At least some of the plurality of signal lines in each of the display panels is connected in common to each of these display panels; and the display device further comprises one signal driver section which applies a display signal voltage corresponding to the display signal to the plurality of signal lines. The scan driver section is separately provided corresponding to each of the plurality of display panels.

The plurality of the display panels in the case of having a $1^{st}$ display panel and a $2^{nd}$ display panel in which the ratio of the numbers of the scanning lines is defined as i: j (i, j are random 1-digit positive integers) comprises a $1^{st}$ common electrode driver section and a $2^{nd}$ common electrode driver section for each common electrode of the $1^{st}$ display panel and the $2^{nd}$ display panel which apply a $1^{st}$ common signal voltage and a $2^{nd}$ common signal voltage that sets a voltage level in each of these common electrodes. The control section controls to repeat alternately an operation which sequentially selects the scanning lines of i-th rows in the $1^{st}$ display panel and an operation which sequentially selects the scanning lines of j-th rows in the $2^{nd}$ display panel by the scan driver section in the display period; and in a period which scans the display pixels of the $1^{st}$ display panel, the signal polarity of the $2^{nd}$ common signal voltage applied to the common electrode of the $2^{nd}$ display panel by the $2^{nd}$ common electrode driver section is set as the same polarity as the signal polarity of the $2^{nd}$ common signal voltage when the scanning lines of the $2^{nd}$ display panel are selected next; and in a period which selects the scanning lines of the $2^{nd}$ display panel, the signal polarity of the $1^{st}$ common signal voltage applied to the $1^{st}$ common electrode of the $1^{st}$ display panel by the $1^{st}$ common electrode driver section is set as the same polarity as the signal polarity of the $2^{nd}$ common signal voltage.

Additionally, as for the above-mentioned plurality of display panels, in the case of having a $1^{st}$ display panel and a $2^{nd}$ display panel in which the ratio of the numbers of the scanning lines is defined as approximated i: j (i, j are random 1-digit positive integers), the control section comprises a dummy period for applied time period adjustment of the common signal voltage which regulates the sum total applied time period for each signal polarity of the common signal voltage to become equal in a relevant display period which is applied to the common electrode of each display panel in the display period. An operation controls to repeat alternately which sequentially selects the scanning lines of i-th rows in the $1^{st}$ display panel and an operation which sequentially selects the scanning lines of j-th rows in the $2^{nd}$ display panel by the scan driver section.

The electronic apparatus in the present invention for acquiring the above-mentioned advantage is an electronic apparatus comprising a display device which displays an image corresponding to a display signal, the display device comprises at least two display panels which comprise a plurality of scanning lines and a plurality of signal lines with display pixels situated near each intersecting point of each scanning line and signal line besides a common electrode situated in common with each of the display pixels; the two display panels having first and second numbers of the scanning lines respectively; a scan driver section which sequentially applies a scanning signal to each of the plurality of scanning lines in each of the plurality of display panels and sequentially sets the display pixels corresponding to the appropriate scanning lines as a selective state; a common electrode driver section which applies a common signal voltage for setting this common electrode voltage level in the common electrode in each of the display panels; and a control section which controls so as to repeat alternately an operation that sequentially selects a number of scanning lines of each of the display panels corresponding to the ratio of the first and second numbers of the scanning lines by the scan driver section for every predetermined scan timing between each of the display panels in a display period at a plurality of times within a one frame period; and for each of the display panels performs reversal control of the signal polarity for each of the common signal voltages applied to the common electrode in each of the display panels by the common electrode driver section so that reversal drive of each of the display panels is performed for every scanning line and for every frame period corresponding to a selection operation for each of the scanning lines of each of the display panels by the scan driver section. For example, the electronic apparatus is a cellular telephone.

The display period comprises a vertical scanning period required for shifting the number of scanning lines of each display panel entirely to a selective state.

The control section in a period which selects the scanning lines of one direction of the display panels of the two display panels by a scan driver section, the signal polarity of the common signal voltage applied to the common electrode of other direction display panel by the common electrode driver section is set as the same polarity as the signal polarity of the common signal voltage which is applied to the common electrode of the relevant other direction display panel when the scanning lines of the other direction display panel are selected next; and in a period which selects the scanning lines of the other direction display panel by the scanning driver section, the signal polarity of the common signal voltage applied to the common electrode of the one direction display panel by the common electrode driver section is set as the same polarity as the signal polarity of the common signal voltage applied to the common electrode of the relevant other direction display panel; performs reversal control of the signal polarity for each of the common signal voltages so that a sum total applied time period for each signal polarity of the common signal voltage applied to the common electrode in each of the display panels becomes equal in the display period; and reversal frequency in a display period within a one frame period of the signal polarity for the common signal voltage applied to the common electrode of each of the display panels is set to the same total as the number of scanning lines of each these display panels.

As for two display panels in the case of having a $1^{st}$ display panel and a $2^{nd}$ display panel in which the ratio of the numbers of the scanning lines is defined as i: j (i, j are random 1-digit positive integers) comprises a $1^{st}$ common electrode driver section and a $2^{nd}$ common electrode driver section for each common electrode of the $1^{st}$ display panel and the $2^{nd}$ display panel which apply a $1^{st}$ common signal voltage and a $2^{nd}$ common signal voltage that sets a voltage level in each of these common electrodes. The control section controls to repeat alternately an operation which sequentially selects the scanning lines of i-th rows in the $1^{st}$ display panel and an operation which sequentially selects the scanning lines of j-th rows in the $2^{nd}$ display panel by the scan driver section in the display period; and in a period which scans the display pixels of the $1^{st}$ display panel, the signal polarity of the $2^{nd}$ common signal voltage applied to the common electrode of the $2^{nd}$ display panel by the $2^{nd}$ common electrode driver section is set as the same polarity as the signal polarity of the $2^{nd}$ common signal voltage when the scanning lines of the $2^{nd}$ display panel are selected next; and in a period which selects the scanning lines of the $2^{nd}$ display panel, the signal polarity of the $1^{st}$ common signal voltage applied to the $1^{st}$ common electrode of the $1^{st}$ display panel by the $1^{st}$ common electrode driver section is set as the same polarity as the signal polarity of the $2^{nd}$ common signal voltage.

Furthermore, in the case of two display panels having a $1^{st}$ display panel and a $2^{nd}$ display panel in which the ratio of the numbers of the first and second scanning lines is defined as approximated i: j (i, j are random 1-digit positive integers), the control section comprises a dummy period for applied time period adjustment of the common signal voltage which regulates the sum total applied time period for each signal polarity of the common signal voltage to become equal in a relevant display period and controls to repeat alternately an operation which sequentially selects the scanning lines of i-th rows in the $1^{st}$ display panel and an operation which sequentially selects the scanning lines of j-th rows in the $2^{nd}$ display panel by the scan driver section.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
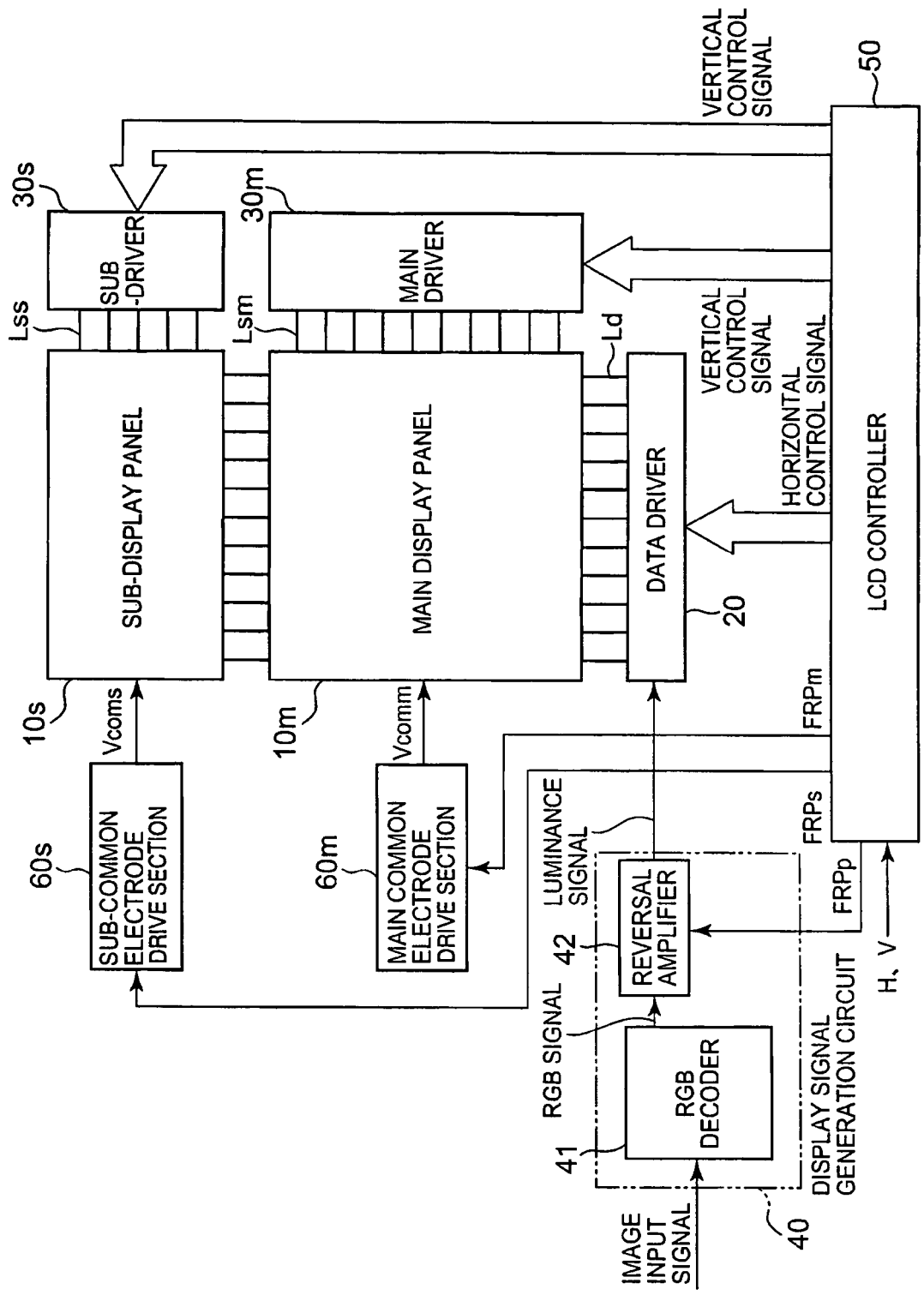
FIG. 1 is an entire configuration view showing one embodiment of the display device related to the present invention.

Hereinafter, a detailed description of the present invention electronic apparatus comprising a display device and associated display device along with a complementary drive control method for the display devices will be explained based on the embodiments shown in the drawings.

<Entire Configuration>

Initially, the entire configuration of the electronic apparatus comprising the display device related to the present invention will be explained.

FIG. 1 is an entire configuration view showing one embodiment of the display device related to the present invention.

As seen in FIG. 1, the display device related to the present invention is divided roughly into a configuration comprising a main display panel 10m, a sub-display panel 10s, a data line group Ld, a data driver 20, scanning line groups Lsm and Lss, a main scan driver 30m, a sub-scan driver 30s, a display signal generation circuit 40, a main common electrode driver circuit 60m, a sub-common electrode driver circuit 60s and an LCD controller 50. The main display panel 10m ($1^{st}$ display panel) and the sub-display panel 10s ($2^{nd}$ display panel) display pixels are arranged in a two-dimensional array and have predetermined panel sizes, respectively. The data line group Ld is arranged so as to extend in the column direction and shared with the main display panel 10m and the sub-display panel 10s. The single data driver 20 (source driver; signal driver section) is connected to the data line group Ld. The scanning line groups Lsm, Lss are arranged so as to extend in the row direction of the main display panel 10m and the sub-display panel 10s. The main scan driver 30m (described as the "main driver" for convenience in the diagram; scan driver section) is connected to the scanning line group Lsm of the main display panel 10m. The sub-scan driver 30s (described as the "sub-driver" for convenience in the diagram; scan driver section) is connected to the scanning line group Lss of the sub-display panel 10s. The display signal generation circuit 40 is constituted with an RGB decoder 41 and a reversal amplifier 42. The main common electrode driver circuit 60m (common electrode driver section) applies a main common signal voltage Vcomm ($1^{st}$ common signal voltage) to a common electrode (counter electrode) of the main display panel 10m. The sub-common electrode driver circuit 60s (common electrode driver section) applies a sub-common signal voltage Vcoms ($2^{nd}$ common signal voltage) to a common electrode of the sub-display panel 10s. The LCD controller 50 (control section) supplies a predetermined control signal to at least the above-mentioned data driver 20, the main scan driver 30m, the sub-scan driver 30s, the main common electrode driver circuit 60m and the sub-common electrode driver circuit 60s. In addition, when the above-mentioned main display panel 10m and the sub-display panel 10s are constituted with a transmission type liquid crystal display panel, the backlight provided consists of, for example, a light source such as a cold cathode-ray tube, etc. and a light-guiding sheet such as an acrylic sheet, etc. in the main display panel 10m and reverse side sub-display panel 10s.

Hereinafter, each component will be explained in detail.

The main display panel 10m and the sub-display panel 10s are liquid crystal display panels which both have a panel structure corresponding to a well-known active-matrix driving method. The main display panel 10m and the sub-display panel 10s comprise the data line group Ld and scanning line groups Ls which are arranged in mutually intersecting directions between opposing transparent substrates, respectively. In addition, a plurality of display pixels (picture element transistors, pixel capacitance and auxiliary capacitance) are arranged near each intersecting point of the data line group Ld and the scanning line groups Ls, which are respectively connected to the data line group Ld and the scanning line groups Ls. Here, referring to FIG. 1, a case is shown in which the number of data lines situated in the main display panel 10m and the sub-display panel 10s are the same. However, as shown in the conventional prior art (refer to FIG. 7, it is possible to reduce the number of data lines allocated in the sub-display panel 10s in comparison to the main display panel 10m.

Also, the above-mentioned main display panel 10m, the sub-display panel 10s, the data line group Ld and the scanning line groups Ls, for example, may have a configuration installed (mounted) on a single flexible printed circuit board. Furthermore, as described later, the data driver 20, the main scan driver 30m and the sub-scan driver 30s may also have a configuration which is mounted on the above-mentioned flexible printed circuit board.

The data driver 20 is connected to the data line group Ld and situated in common with the above-described main display panel 10m and the sub-display panel 10s. Based on a horizontal control signal provided from the LCD controller 50, the data driver 20 is supplied from the display signal generation circuit 40. For example, each color of the luminance signal (display signal) of R (red), G (green) and B (blue) is taken in for 1row units and held. Subsequently, display signal voltage corresponding to this luminance signal is simultaneously supplied to the data line group Ld.

The main scan driver 30m and the sub-scan driver 30s are connected respectively to each of the scanning line groups Lsm, Lss situated by the above-mentioned main display panel 10m and sub-display panel 10s. Based on a vertical control signal outputted from the LCD controller 50, a predetermined scanning signal (selection signal) is sequentially applied to each scanning line of the main display panel 10m and the sub-display panel 10s which sets a selective state. Accordingly, while synchronizing with this selection timing, display signal voltage is written to the display pixels corresponding to the scanning lines set as a selective state by applying display signal voltage corresponding to the luminance signal from the data driver 20 to the display pixel positions which intersect with the above-mentioned data line group Ld. Here, the panel sizes of the main display panel 10m and the sub-display panel 10s, namely, the number of scanning lines, are different and the panel size ratio (number of scanning lines) of the main display panel 10m and sub-display panel 10s is approximated (i: j; i, j are random 1-digit positive integers). Briefly, the main scan driver 30m and the sub-scan driver 30s related to the embodiment function at timing corresponding to this panel size ratio. After sequentially applying a scanning signal to the scanning lines of the i-th row segment in the main display panel 10m and accomplishing scanning drive, an operation sequentially applies a scanning signal to the scanning lines of the j-th row segment in the sub-display panel 10s and accomplishes scanning drive. Operational control is performed so as to repeat alternately between the main display panel 10m and the sub-display panel 10s. Accordingly, display signal voltage corresponding to the luminance signal is sequentially written to the display pixels for each row in the main display panel 10m and the sub-display panel 10s. The functions and operation of the main scan driver 30m and the sub-scan driver 30s will be further explained in the drive control method.

Figure 7:
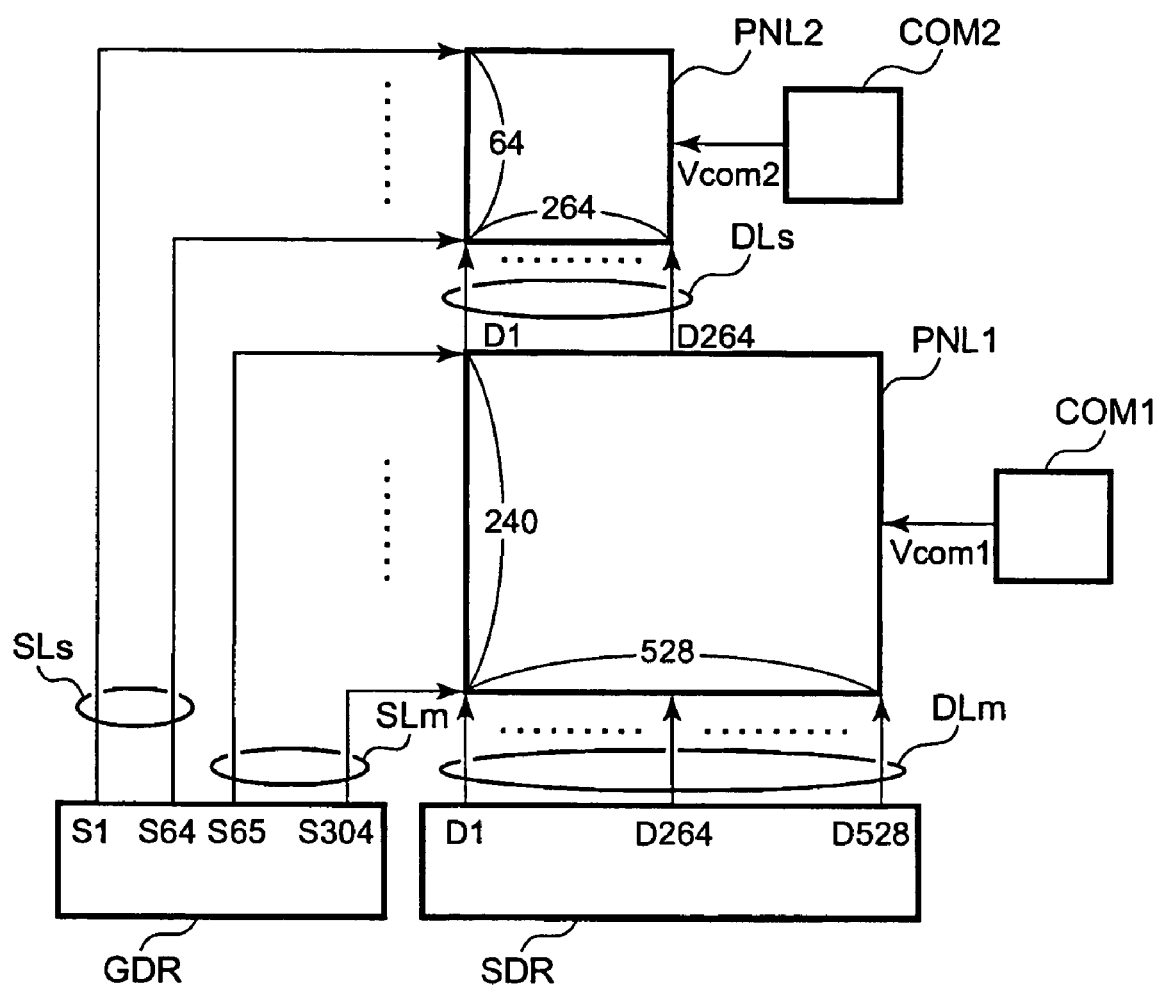
FIG. 7 is an outline configuration diagram showing an example of a conventional prior art display device comprised with two display panels.
Figure 8:
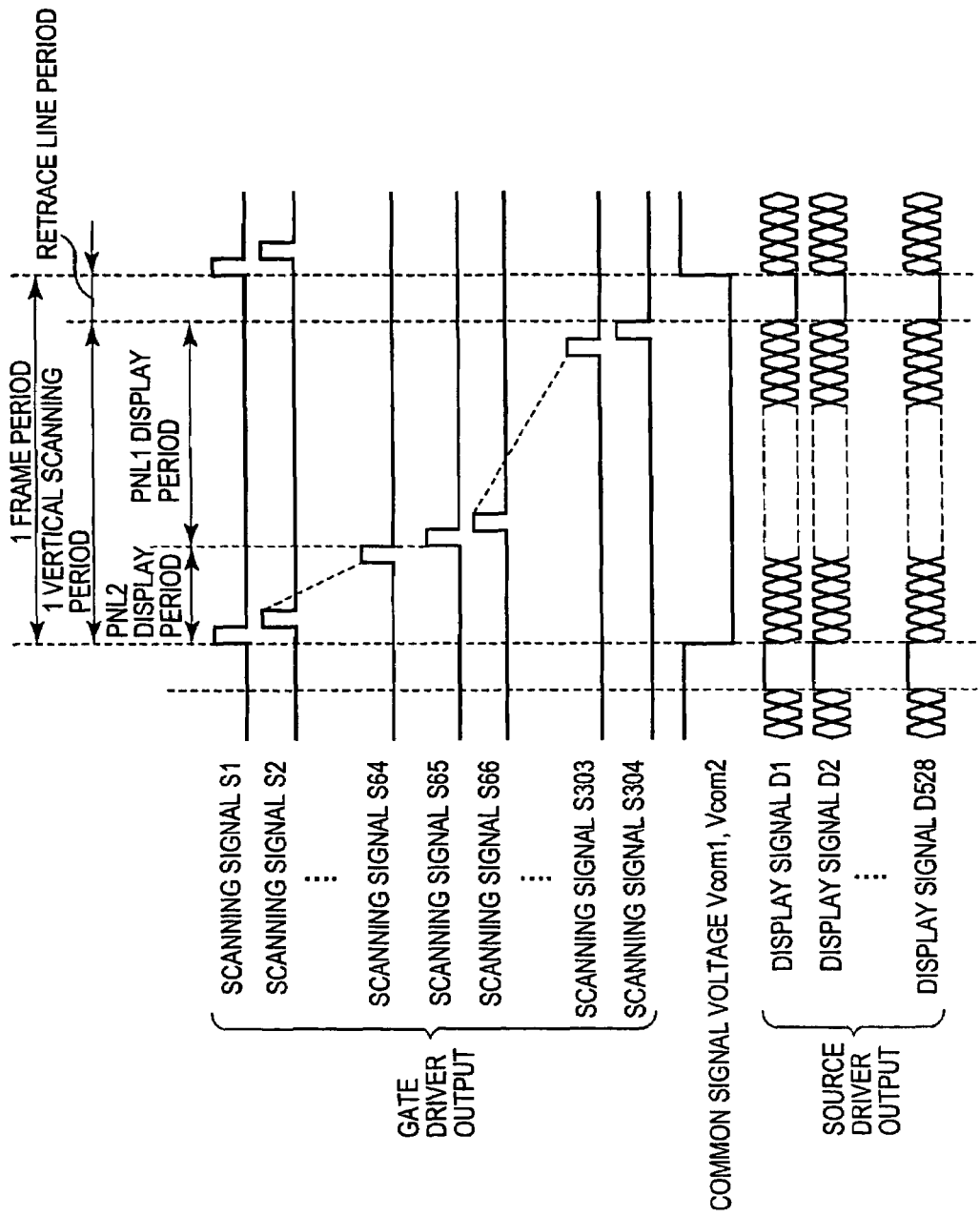
FIG. 8 is a timing chart showing an example of the display drive control method in a conventional prior art display device.
Figure 9:
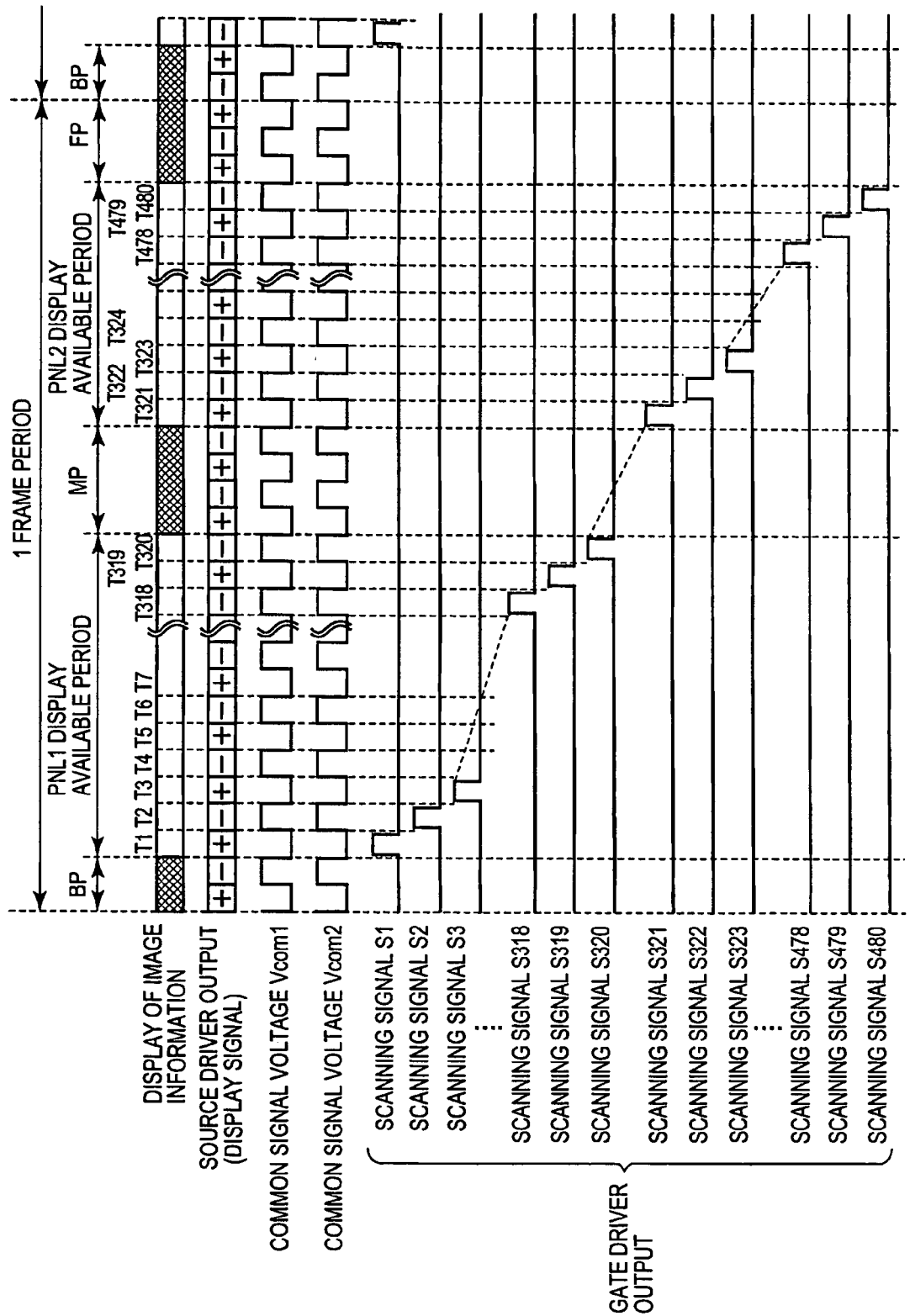
FIG. 9 is a timing chart showing a case of performing display drive with a conventional prior art display device by line reversal drive method and frame reversal drive method.

Also, FIG. 1 shows a functional block diagram of an outline configuration for the display device related to the present invention. Although the main scan driver 30m and the sub-scan driver 30s provided corresponding to each of the display panels are shown as a separate configuration, specifically as seen in FIG. 7 for example, the device may have a configuration in which these scan drivers are formed in one component using a single driver chip or may have a configuration provided with separate driver chips as shown in FIG. 1.

The RGB decoder 41 constituted in the display signal generation circuit 40, for example, extracts each chrominance signal (RGB signal) of R, G, B from an image input signal supplied from the exterior of the display device and outputs to the reversal amplifier 42. In addition, the reversal amplifier 42 performs reversal processing of the RGB signal polarity extracted by the RGB decoder 41 based on a polarity reversal signal FRPp (frame/line reversal signal) supplied from the LCD controller 50. A RGB reversal signal (also referred to as an inversion signal) is generated and outputted to the data driver 20 as the luminance signal (analog signal).

The LCD controller 50 generates the above-mentioned polarity reversal signal FRPp and polarity reversal signals FRPm, FRPs based on a horizontal synchronizing signal H and a vertical synchronizing signal V supplied from the exterior of the display device (or extracted from an image input signal by the RGB decoder 41). While individually supplying the reversal amplifier 42 as well as the main common electrode driver circuit 60m and the sub-common electrode driver circuit 60s described later, display signal voltage corresponding to the luminance signal is applied to each display pixel (pixel electrode side) at predetermined timing by generating a horizontal control signal and a vertical control signal and supplying the data driver 20, the main scan driver 30m and the sub-scan driver 30s, respectively, and control is effected to display the predetermined image information based on the image input signal to the main display panel 10m and the sub-display panel 10s.

Here, in the LCD controller 50 relating to the embodiment, the drive control operation distinctive to the embodiment (described later) is performed by controlling the polarity reversal signals FRPp, FRPm, FRPs supplied to the reversal amplifier 42, the main common electrode driver circuit 60m and the sub-common electrode driver circuit 60s together with the horizontal control signal and the vertical control signal which are supplied to the data driver 20, the main scan driver 30m and the sub-scan driver 30s.

Particularly, in the scanning interval which writes display signal voltage in the main display panel 10m and the sub-display panel 10s, the operation which scans (scanning signal applied to the scanning lines) each row of the main display panel 10m and the sub-display panel 10s is switched between the main scan driver 30m and the sub-scan driver 30s for every row of a predetermined number and a vertical control signal setting is alternately repeated.

The main common electrode driver circuit 60m and the sub-common electrode driver circuit 60s are connected to the common electrode provided in the above-mentioned main display panel 10m and the sub-display panel 10s, respectively.

The main common signal voltage Vcomm and the sub-common signal voltage Vcoms applied to each common electrode are set in order for the signal polarity to reverse relative to the display signal voltage which is applied to each display pixel (pixel electrode) of the main display panel 10m and the sub-display panel 10s based on the polarity reversal signals FRPm, FRPs outputted from the LCD controller 50.

Next, the electronic apparatus in connection with the present invention will be explained.

A cellular telephone comprising two display panels is an electronic apparatus which can ideally apply the display device relating to the present invention.

Figure 2A:
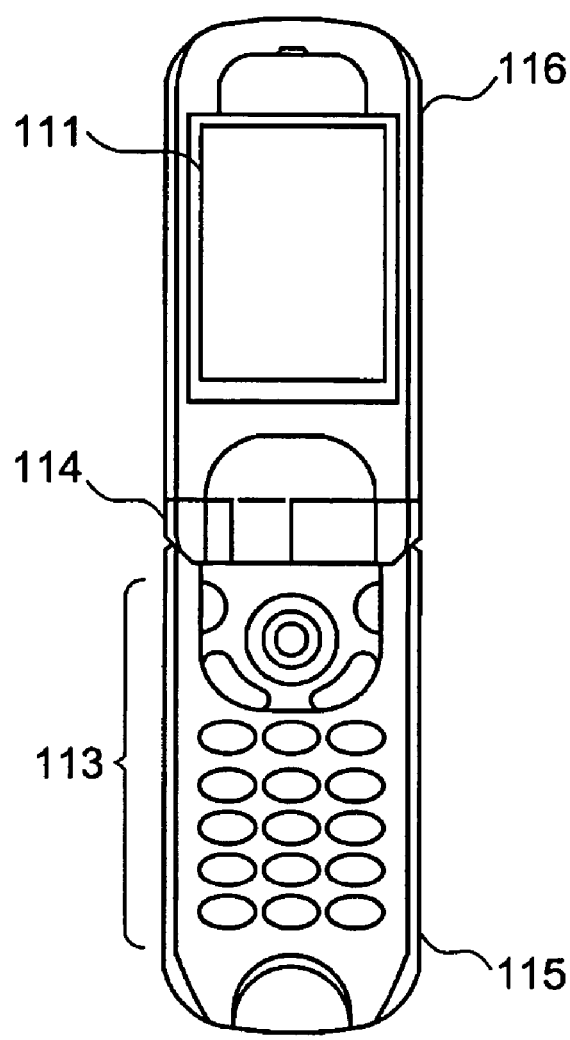
FIGS. 2A and 2B are entire configuration views showing one embodiment of the electronic apparatus (cellular telephone) related to the present invention.
Figure 2B:
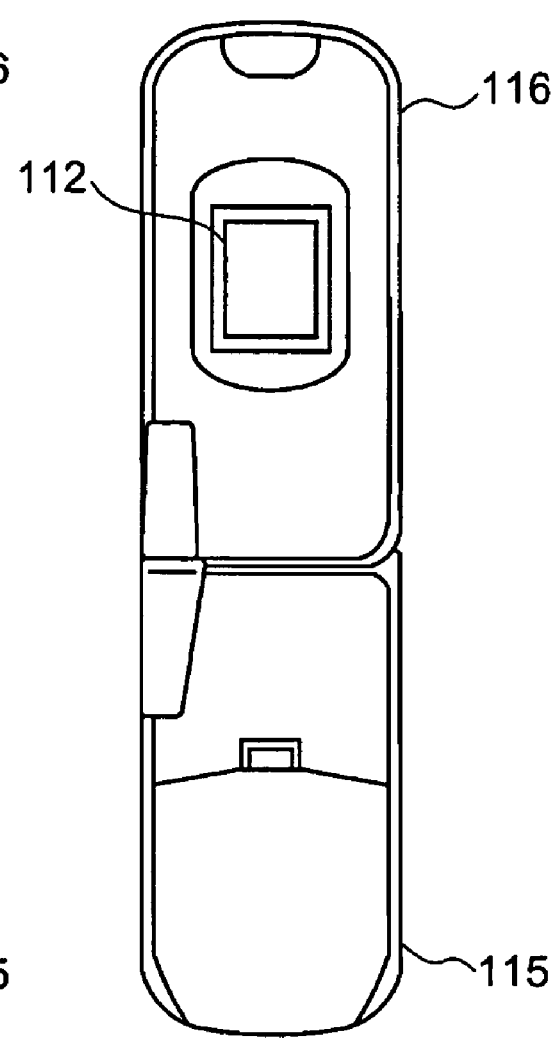

FIGS. 2A and 2B are entire configuration views showing one embodiment of the electronic apparatus (cellular telephone) related to the present invention.

FIG. 2A is a drawing showing the primary operation functions surface (inner surface) side of the electronic apparatus (cellular telephone) related to the embodiment. FIG. 2B is a drawing showing the reverse (outer surface) side of an electronic apparatus. Here, although the apparatus illustrated has a foldable case structure, this shape is just one of various types employed in cellular telephones. Therefore, it is stressed that the electronic apparatus can have another style of case structure, such as a bar type, a revolving (rotatable) type, a slide (swivel) type, etc.

As seen in FIGS. 2A and 2B, the cellular telephone 100 related to the embodiments, briefly, has a configuration which is foldable and constructed with a lower section casing 115 next to a centrally placed hinge joint 114, manual operation buttons 113 (keypad), etc; and an upper section display casing 116 with a main display 111 (corresponds to the above-mentioned main display panel 10m) and a sub-display 112 (corresponds to the above-mentioned sub-display panel 10s) installed back to back.

Namely, in the lower section casing 115, the manual operation buttons 113 are provided on the primary operation surface (case lower inner surface) side with an assortment of buttons for performing selection and execution of specific functions, such as entering a telephone number for placing a phone call, buttons used for inputting alphanumeric characters, a telephone directory or other various applications. The upper section display casing 116 is provided with, for example, the main display 111 which displays the alphanumeric characters and symbols input by manipulating the above-mentioned manual operation buttons 113 or an executed application, etc. and is situated opposing (facing inwards) the above-mentioned manual operation buttons 113 when the foldable cellular telephone 100 is closed. Also, the sub-display 112 displays, for example, the current time and date, the incoming status of E-mail and telephone calls, etc. when the cellular telephone 100 is folded and situated on the reverse side (facing outwards) of the out of view main display 111. The main display 111, for example, employs a relatively high definition display panel consisting of a reasonably large screen with a diagonal dimension of about two inches (2"). The sub-display 112, for example, employs a relative low image quality display panel consisting of a comparatively smaller screen with a diagonal dimension of about one inch (1").

Next, the drive control operation of the display device which has such the configuration mentioned above will be explained with reference to the drawings. Here, the drive control operation (display drive control method) illustrated below is performed based on various types of control signals supplied from the LCD controller 50 stated above.

$1^{st}$ Embodiment

Figure 3:
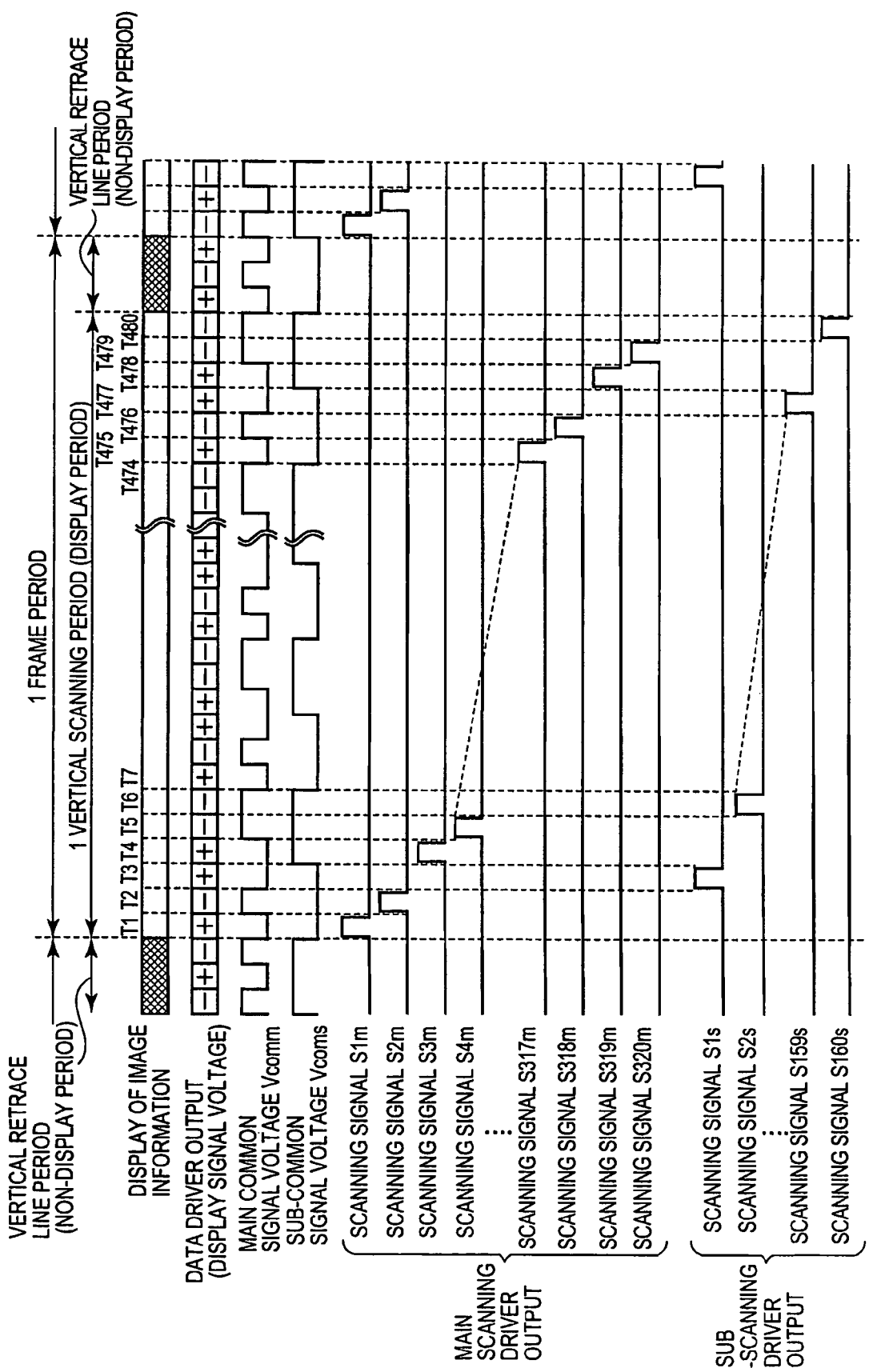
FIG. 3 is a timing chart showing the first embodiment of the drive control method in the liquid crystal display related to the present invention.

FIG. 3 is a timing chart showing the first embodiment of the drive control method in the liquid crystal display related to the present invention.

Here, a case of the drive control method will be explained in relation to the display device (refer to FIG. 1) comprising the configuration explained previously. The number of scanning lines allocated in the main display panel 10m is 320. The number of scanning lines allocated in the sub-display panel 10s is 160. The panel size ratio (number of scanning lines) of the main display panel 10m and the sub-display panel 10s that will be explained is precisely 2:1.

Also, the number of data lines in the main display panel 10m and the sub-display panel 10s can be the same number or may be a different number.

The drive control method of the display device related to the embodiment, as seen in FIG. 3, depicts 1 vertical scanning period (display period) within a 1 frame period. Initially, at scan timing T1 (horizontal scanning period), the main scan driver 30m applies a high-level scanning signal S1m relative to the $1^{st}$ row (line) scanning line in the main display panel 10m based on a vertical control signal supplied from the LCD controller 50. Subsequently, at scan timing T2, a high-level scanning signal S2m is sequentially applied relative to the $2^{nd}$ row scanning line. While synchronizing to the applied timing of the scanning signal for each of these rows, a predetermined luminance signal is sequentially written relative to the $1^{st}$ and $2^{nd}$ rows of the display pixels in the main display panel 10m by simultaneously applying display signal voltage relative to the $1^{st}$ row of the display pixels in the main display panel 10m from the data driver 20 at scan timing T1 and display signal voltage relative to the $2^{nd}$ row of the display pixels in the main display panel 10m at scan timing T2 via each data line.

Here, the display signal voltage applied at scan timing T1 is set as a signal voltage which constitutes positive polarity relative to a predetermined display center voltage and the display signal voltage applied at scan timing T2 is set as a signal voltage which constitutes negative polarity relative to the proper display center voltage.

Furthermore, the main common signal voltage Vcomm applied from the main common electrode driver circuit 60m to the common electrode of the main display panel 10m is set as signal voltage (low-level) which constitutes negative polarity relative to a common signal center voltage Vcomc at the above-mentioned scan timing T1 and is set as signal voltage (high-level) relative to the proper common signal center voltage Vcomc at scan timing T2.

On the other hand, since a display data writing operation of the display data is not performed during scan timing T1, T2 in the sub-display panel 10s side, while low-level scanning signals S1s~S160s are applied from the sub-scan driver 30s to each scanning line in the sub-display panel 10s based on a vertical control signal supplied from the LCD controller 50, the sub-common signal voltage Vcoms which has any one of the high or low signal levels is applied from the sub-common electrode driver circuit 60s to the common electrode of the sub-display panel 10s and further controlled so that the same signal level (low-level in FIG. 3) of the sub-common signal voltage Vcoms is applied, for example, during the periods of consecutive scan timing T1, T2, based on the polarity reversal signal FRPs supplied from the LCD controller 50.

Subsequently, at scan timing T3, the sub-scan driver 30s applies a high-level scanning signal S1s relative to the $1^{st}$ row scanning line in the sub-display panel 10s based on a vertical control signal supplied from the LCD controller 50.

While synchronizing to scan timing T3, a predetermined luminance signal is written relative to the 1$^{st}$ row of the display pixels in the sub-display panel 10s by simultaneously applying display signal voltage of positive polarity relative to the 1$^{st}$ row of the display pixels in the sub-display panel 10s via each data line from the data driver 20. Here, a low-level sub-common signal voltage Vcoms is applied from the sub-common electrode driver circuit 60s to the common electrode of the sub-display panel 10s. Accordingly, at periods of scan timing T1~T3, sub-common signal voltage Vcoms having the same signal level (low-level) is applied continuously.

On the other hand, since a display data writing operation of the display data is not performed during scan timing T3 in main display panel 10m side, while low-level scanning signals S1m~S320m are applied from the main scan driver 30m to each scanning line in the main display panel 10m based on a vertical control signal supplied from the LCD controller 50, the common signal voltage Vcomm which has any one of the high or low signal levels (low-level in FIG. 3) is applied from the main common electrode driver circuit 60m to the common electrode of the main display panel 10m based on the polarity reversal signal FRPm supplied from the LCD controller 50.

Subsequently, at scan timing T4, T5, the main scan driver 30m sequentially applies high-level scanning signals S3m, S4m relative to the 3$^{rd}$ and 4$^{th}$ rows in the main display panel 10m based on a vertical control signal.

While synchronizing to this scan timing, a predetermined luminance signal is sequentially written relative to the 3$^{rd}$ and 4$^{th}$ rows of the display pixels in the main display panel 10m by simultaneously applying display signal voltage of positive polarity relative to the 3$^{rd}$ row of the display pixels in the main display panel 10m from the data driver 20 at scan timing T4 and display signal voltage of negative polarity relative to the 4$^{th}$ row of the display pixels in the main display panel 10m at scan timing T5 via each data line.

Here, the main common signal voltage Vcomm which becomes low-level at scan timing T4 and high-level at scan timing T5 is sequentially applied from the main common electrode driver circuit 60m to the common electrode of the main display panel 10m. Accordingly, at scan timing T3, T4, the main common signal voltage Vcomm having the same signal level (low-level) is applied continuously.

More specifically focused on each scan timing T1, T2, T4, T5, T7, T8, . . . , as display signal voltage of positive polarity and negative polarity is alternately applied to the pixel electrodes for each row of display pixels in the main display panel 10m, low-level and high-level main common signal voltage Vcomm is alternately applied to the common electrode of the main display panel 10m and line (row) reversal drive is performed in the main display panel 10m.

On the other hand, in scan timing T4, T5 on the sub-display panel 10s side while low-level scanning signals S1s~S160s are applied to each scanning line from the sub-scan driver 30s based on a vertical control signal, the sub-common signal voltage Vcoms which has any one of the high or low signal levels (high-level in FIG. 3) is applied continuously from the sub-common electrode driver circuit 60s to the common electrode based on the polarity reversal signal FRPs.

Subsequently, at scan timing T6, the sub-scan driver 30s applies a high-level scanning signal S2s relative to the 2$^{nd}$ row scanning line in the sub-display panel 10s based on a vertical control signal.

While synchronizing to this scan timing T6, a predetermined luminance signal is written relative to the 2$^{nd}$ row of the display pixels in the sub-display panel 10s by simultaneously applying display signal voltage of negative polarity relative to the 2$^{nd}$ row of the display pixels in the sub-display panel 10s via each data line from the data driver 20. Here, a high-level sub-common signal voltage Vcoms is applied from the sub-common electrode driver circuit 60s to the common electrode of the sub-display panel 10s. Accordingly, at periods of scan timing T4~T6, sub-common signal voltage Vcoms having the same signal level (high-level) is applied continuously.

More specifically focused on each scan timing T3, T6, T9, . . . , as display signal voltage of positive polarity and negative polarity is alternately applied to the pixel electrodes for each row of display pixels in the sub-display panel 10s, low-level and high-level sub-common signal voltage Vcoms is alternately applied to the common electrode of the sub-display panel 10s and line (row) reversal drive is performed in the sub-display panel 10s.

On the other hand, in this scan timing T6 on the main display panel 10m side while low-level scanning signals S1m~S320m are applied to each scanning line from the main scan driver 30m based on a vertical control signal, the main common signal voltage Vcomm which has anyone of the high or low signal levels (high-level in FIG. 3) is applied continuously from the main common electrode driver circuit 60m to the common electrode based on the polarity reversal signal FRPm.

Hereinafter, by alternately repeating execution of similar control operations until scan timing T480 which performs scanning drive for 1 row segments of the scanning lines in the sub-display panel 10s after performing scanning drive for 2 row segments of the main display panel 10m, the desired luminance signal (display signal voltage) is written and displayed as image information in both the main display panel 10m which has 320 scanning lines and the sub-display panel 10s which has 160 scanning lines in 1 vertical scanning period (display period) within a 1 frame period.

Furthermore, a vertical retrace line period is set after conclusion of 1 vertical scanning period within a 1 frame period regarding the display signal voltage together with the main common signal voltage Vcomm and sub-common signal voltage Vcoms applied to each row of the display pixels (pixel electrodes and common electrode) in the main display panel 10m and the sub-display panel 10s in the above-mentioned 1 vertical scanning period. The period (for example, period of 3 phase segments in FIG. 3) of duration allocated for odd-numbered segments is identical for each scan timing T1~T480 in the above-mentioned vertical scanning period. In these vertical retrace line periods (non-display periods), the odd-numbered reversals of the main common signal voltage Vcomm and sub-common signal voltage Vcoms are performed. For example, as seen in FIG. 3, the main common signal voltage Vcomm is reversed 3 times and the sub-common signal voltage Vcoms is reversed 1 time. Accordingly, the signal polarity of each signal voltage in the next 1 frame period is reversed and frame reversal drive is performed in the main display panel 10m and the sub-display panel 10s.

Moreover, for example as shown in FIG. 3, when performing scanning drive in the sub-display panel 10s, the signal polarity of the main common signal voltage Vcomm in the main display panel 10m side is set to the same polarity as the signal polarity of the sub-common signal voltage Vcoms in the sub-display panel 10s. Also, when performing scanning drive in the main display panel 10m, the signal polarity of the sub-common signal voltage Vcoms in the sub-display panel 10s side is set to the same polarity as the signal polarity of the sub-common signal voltage Vcoms in the sub-display panel 10s for the following scanning drive occurrence.

Accordingly, in 1 vertical scanning period (display period), line (row) reversal drive is performed regarding the main display panel 10m and the sub-display panel 10s, respectively, and set in each display panel so as to become the same sum total time between each signal polarity (namely, the periods when the signal polarity constitutes positive polarity and the periods which constitute negative polarity are equal) of each common signal voltage Vcomm, Vcoms. The reversal drive frequency of the main common signal voltage Vcomm applied to the main display panel 10m is the same total as the number of scanning lines in the main display panel 10m. The reversal drive frequency of the sub-common signal voltage Vcoms applied to the sub-display panel 10s is the same total as the number of scanning lines in the sub-display panel 10s.

Additionally, when one display is performing scanning drive in one display panel, the signal polarity of the common signal voltage is applied to the common electrode in the second display panel. However, the present invention is not limited to that which is set to the same polarity as the signal polarity of the common signal voltage applied to the common electrode of one display panel as mentioned above. For example, the apparatus may be set to reversed polarity or to reversed polarity only one time for every predetermined frequency randomly. In summation, other techniques maybe applied so long as the apparatus is set so that a variation does not occur between the sum total time of the signal polarities for each common signal voltage during the write-in period (1 vertical scanning period) of the luminance signal of 1 screen page in the main display panel and sub-display panel.

Consequently, in the conventional prior art display device comprised with two display panels implemented with a line reverse drive method and a frame reversal drive method, when performing sequential scanning drive of each display panel and writing in the luminance signal of either of the common signal voltages individually applied to the common electrode of each display panel, what is accomplished is to perform reversal drive only for the frequency (rate of repetition) corresponding to the overall number of the scanning lines allocated in two display panels. However, according to the display device related to the embodiment, what is accomplished is just to perform reversal drive for the common signal voltage on the main display panel side only for the frequency corresponding to the number of scanning lines allocated in the main display panel in 1 vertical scanning period (display period). Furthermore, because reversal drive of the common signal voltage on the sub-display side is performed only for the frequency corresponding to the number of scanning lines allocated in the sub-display panel, the driving cycles (frequency rate of repetition) related to the reversal drive can be decreased. In this manner, while a reduction in power consumption can be achieved, line reversal drive and frame reversal drive in the main display panel and the sub-display panel can be accomplished. Thus, degeneration and seizing of the liquid crystal molecules in the display pixel configuration which results in deterioration of the display image quality by a flickering problem, device malfunction, etc. can be more precisely controlled.

2$^{nd}$ Embodiment

Next, the second embodiment of the drive control operation of the display device which has the configuration mentioned above will be explained with reference to the drawings.

Figure 4:
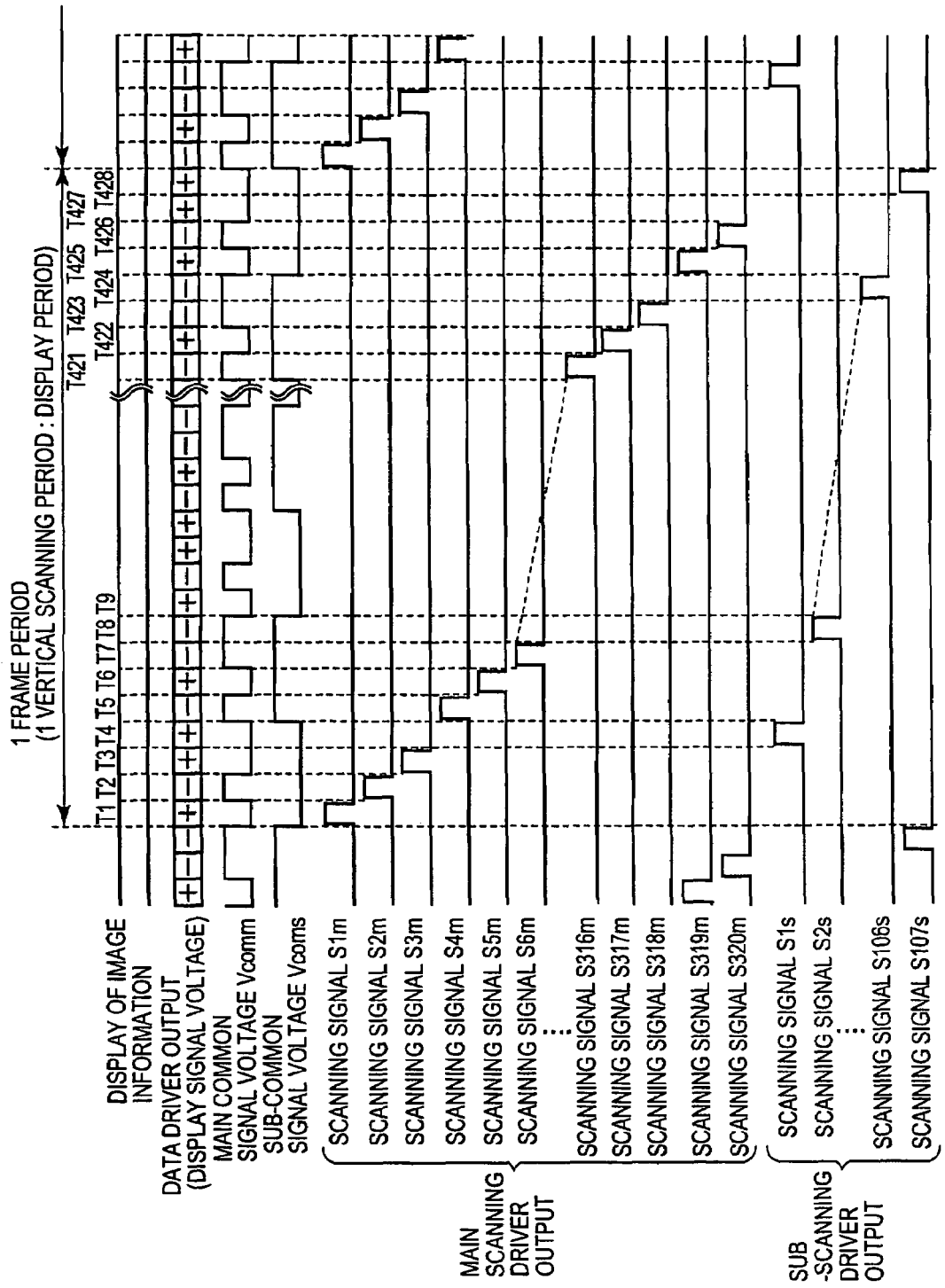
FIG. 4 is a timing chart showing the second embodiment of the drive control method in the liquid crystal display related to the present invention.

FIG. 4 is a timing chart showing the second embodiment of the drive control method in the liquid crystal display related to the present invention.

In addition, explanation is simplified or omitted in regard to control operations equivalent to the first embodiment mentioned above.

In this embodiment of the display device (refer to FIG. 1) which contains the configuration mentioned above, the number of scanning lines allocated in the main display panel 10m is 320. The number of scanning lines allocated in the sub-display panel 10s is 107. The panel size ratio (number of scanning lines) of the main display panel 10m and the sub-display panel 10s will be explained as a case approximated 3:1 instead of a simpler integer ratio.

Also, the number of data lines in the main display panel 10m and the sub-display panel 10s can be the same number or may be a different number.

The drive control method of the display device related to the embodiment, as seen in FIG. 4, depicts 1 vertical scanning period within a 1 frame period. Initially, at scan timing T1~T3 (horizontal scanning period), high-level scanning signals S1m~S3m are sequentially applied relative to the 1$^{st}$ thru 3$^{rd}$ rows of the scanning lines in the main display panel 10m from the main scan driver 30m. While synchronizing to this scan timing T1~T3, a predetermined luminance signal is sequentially written relative to the 1$^{st}$ thru 3$^{rd}$ rows of the display pixels in the main display panel 10m by sequentially applying display signal voltage relative to each of the display pixels for the 1$^{st}$ thru 3$^{rd}$ rows in the main display panel 10m via each data line from the data driver 20.

Here, as seen in FIG. 4, the display signal voltage applied from the data driver 20 at scan timing T1~T3, for example, is set to a signal voltage consisting of each polarity of positive, negative, positive, respectively, relative to a predetermined display center voltage. Also, the main common signal voltage Vcomm applied from the main common electrode driver circuit 60m to the common electrode of the main display panel 10m is set to a signal voltage consisting of each polarity of positive, negative, positive, respectively, relative to predetermined common signal center voltage Vcomc.

On the other hand, since a writing operation of the display data is not performed during scan timing T1~T3 in the sub-display panel 10s side, while low-level scanning signals S1s~S107s are applied from the sub-scan driver 30s to each scanning line in the sub-display panel 10s, the operation executes control so that the sub-common signal voltage Vcoms which has any one of the high or low signal levels (low-level in FIG. 4) is applied continuously from the sub-common electrode driver circuit 60s to the common electrode of the sub-display panel 10s.

Subsequently, at scan timing T4, a high-level scanning signal S1s is applied relative to the 1$^{st}$ row scanning line of the sub-display panel 10s from the sub-scan driver 30s.

Here, low-level sub-common signal voltage Vcoms is applied from the sub-common electrode driver circuit 60s to the common electrode of the sub-display 10s. Accordingly, during scan timing T1~T4, the sub-common signal voltage Vcoms having the same signal level (low-level) is applied continuously.

On the other hand, since a display data writing operation is not performed during scan timing T4 in the main display panel 10m side, while low-level scanning signals S1m~S320m are applied from the main scan driver 30m to each scanning line in the main display panel 10m, the main common signal voltage Vcomm which has any one of the high or low signal levels (low-level in FIG. 4) is applied from the main common electrode driver circuit 60m to the common electrode of the main display panel 10m. Accordingly, at scan timing T3, T4, the main common signal voltage Vcomm having the same signal level (low-level) is applied continuously.

Subsequently, at scan timing T5~T7, high-level scanning signals S4m~S6m are sequentially applied relative to the 4$^{th}$ thru 6$^{th}$ rows of the scanning lines in the main display panel 10m from the main scan driver 30m. While synchronizing to this scan timing T5~T7, a predetermined luminance signal is sequentially written relative to the 4$^{th}$ thru 6$^{th}$ rows of the display pixels in the main display panel 10m by sequentially applying display signal voltage relative to each of the display pixels for the 4$^{th}$ thru 6$^{th}$ rows in the main display panel 10m via each data line from the data driver 20.

Here, the display signal voltage applied from the data driver 20 at scan timing T5~T7 is set to signal voltage consisting of each polarity of positive, negative, positive, respectively, relative to a predetermined display center voltage. Also, the main common signal voltage Vcomm applied from the main common electrode driver circuit 60m to the common electrode of the main display panel 10m is set to signal voltage consisting of each polarity of positive, negative, positive, respectively, relative to predetermined common signal center voltage Vcomc.

More specifically focused on each scan timing T1~T3, T5~T7, T9~, . . . , as the display signal voltage of positive polarity and negative polarity is alternately applied to the pixel electrodes for each row of display pixels in the main display panel 10m, low-level and high-level main common signal voltage Vcomm is alternately applied to the common electrode of the main display panel 10m and line (row) reversal drive is performed in the main display panel 10m.

On the other hand, in scan timing T5~T7 on the sub-display panel 10s side while low-level scanning signals S1s~S107s are applied to each scanning line from the sub-scan driver 30s, the sub-common signal voltage Vcoms which has any one of the high or low signal levels (high-level in FIG. 4) is applied continuously from the sub-common electrode driver circuit 60s to the common electrode based on the polarity reversal signal FRPs.

Subsequently, at scan timing T8, the sub-scan driver 30s applies a high-level scanning signal S2s relative to the 2$^{nd}$ row scanning line in the sub-display panel 10s. While synchronizing to this scan timing T8, a predetermined luminance signal is written relative to the 2$^{nd}$ row of the display pixels in the sub-display panel 10s by simultaneously applying display signal voltage of negative polarity relative to the 2$^{nd}$ row of the display pixels in the sub-display panel 10s via each data line from the data driver 20. Here, a high-level sub-common signal voltage Vcoms is applied from the sub-common electrode driver circuit 60s to the common electrode of the sub-display panel 10s. Accordingly, at periods of scan timing T5~T8, sub-common signal voltage Vcoms having the same signal level (high-level) is applied continuously.

More specifically focused on scan timing T4, T8, . . . , as display signal voltage of positive polarity and negative polarity is alternately applied to the pixel electrodes for each row of display pixels in the sub-display panel 10s, low-level and high-level sub-common signal voltage Vcoms is alternately applied to the common electrode of the sub-display panel 10s and line (row) reversal drive is performed in the sub-display panel 10s.

On the other hand, in this scan timing T8 on the main display panel 10m side while low-level scanning signals S1m~S320m are applied to each scanning line from the main scan driver 30m,the main common signal voltage Vcomm which has any one of the high or low signal levels (high-level in FIG. 4) is applied continuously from the main common electrode driver circuit 60m to the common electrode. Accordingly, at periods of scan timing T7~T8, the main common signal voltage Vcomm having the same signal level (high-level) is applied continuously.

Hereinafter, by alternately repeating execution of similar control operations until scan timing T428 which perform scanning drive for 1 row segments of the scanning lines in the sub-display panel 10s after performing scanning drive for 3 row segments of the main display panel 10m, the desired luminance signal (display signal voltage) is written and displayed as image information in both the main display panel 10m which has 320 scanning lines and the sub-display panel 10s which has 107 scanning lines in 1 vertical scanning period (display period) within a 1 frame period.

Here, in this embodiment, because the panel size ratio (number of scanning lines) of the main display panel 10m and the sub-display panel 10s are not precisely 3:1, when signal polarity reversal timing of each common signal voltage Vcomm, Vcoms is implemented to timing corresponding only to the scanning lines in each display panel, the timing generated in the alternating scanning drive for the number of scanning lines in each display panel will not be constant. For example as illustrated in FIG. 4, preceding scan timing T425, although scanning drive for 3 row segments of the scanning lines in the main display panel 10m is performed continuously, scanning drive is performed for only 2 row segments of the scanning lines following scan timing T425. Therefore, in this embodiment during 1 vertical scanning period, scanning drive of the scanning lines of each display panel is not performed for the purpose of regulating the sum total time for each signal polarity of each common signal voltage so as to be the same. Instead a dummy scanning interval is provided for adjusting the applied time period of each common signal voltage. As for this dummy scanning interval in FIG. 4, the scan timing T427 has a period equivalent to 1 scan timing set within 1 vertical scanning period. Accordingly, sum total time for each signal polarity of each common signal voltage Vcomm, Vcomms can be made the same (equalized).

Furthermore, based on the above-mentioned drive control method of 1 frame period (1 vertical scanning period), the display signal voltage and main common signal voltage Vcomm which are applied to each row of the display pixels (pixel electrodes and common electrode) in the main display panel 10m and the sub-display panel 10s, each signal polarity of the sub-common signal voltage Vcoms will be reversed in the following frame period and frame reversal drive is performed in the main display panel 10m and the sub-display panel 10s Also, for example as seen in FIG. 4, when performing scanning drive of the sub-display panel 10s, the signal polarity of the main common signal voltage Vcomm on the main display panel 10m side is set to the same polarity as the signal polarity of the sub-common signal voltage Vcoms in the sub-display panel 10s. Besides, when performing scanning drive of the main display panel 10m, the signal polarity of the sub-common signal voltage Vcoms on the sub-display panel 10s side is set to the same polarity as the signal polarity of the sub-common signal voltage Vcoms in the sub-display panel 10s for the following scanning drive occurrence. Accordingly, in 1 vertical scanning period, while being able to establish the reversal drive frequency of the main common signal voltage Vcomm applied to the main display panel 10m equal to the number of scanning lines in the main display panel 10m, the reversal drive frequency of the sub-common signal voltage Vcoms applied to the sub-display panel 10s is the same total as the number of scanning lines in the sub-display panel 10s.

Consequently, even in the case where the panel size ratio (number of scanning lines) of the main display panel and the sub-display panel is established as 3:1 in general, similar to the first embodiment mentioned above in which the common signal voltage is individually applied to the main display panel and the sub-display panel, this method simply necessitates reversal drive for only the frequency corresponding to the number of scanning lines allocated in the main display panel or the sub-display panel, respectively. In this manner, while being able to reduce the driving cycles (frequency) related to the reversal drive to achieve a reduction in power consumption, line reversal drive and frame reversal drive in the main display and the sub-display can be accomplished. Therefore, degeneration and seizing of the liquid crystal molecules in the display pixel configuration which results in deterioration of the display image quality by a flickering problem, device malfunction, etc. can be more precisely controlled.

3$^{rd}$ Embodiment

Next, the third embodiment of the drive control operation of the display device which has the configuration mentioned above will be briefly explained with reference to the drawings.

Figure 5:
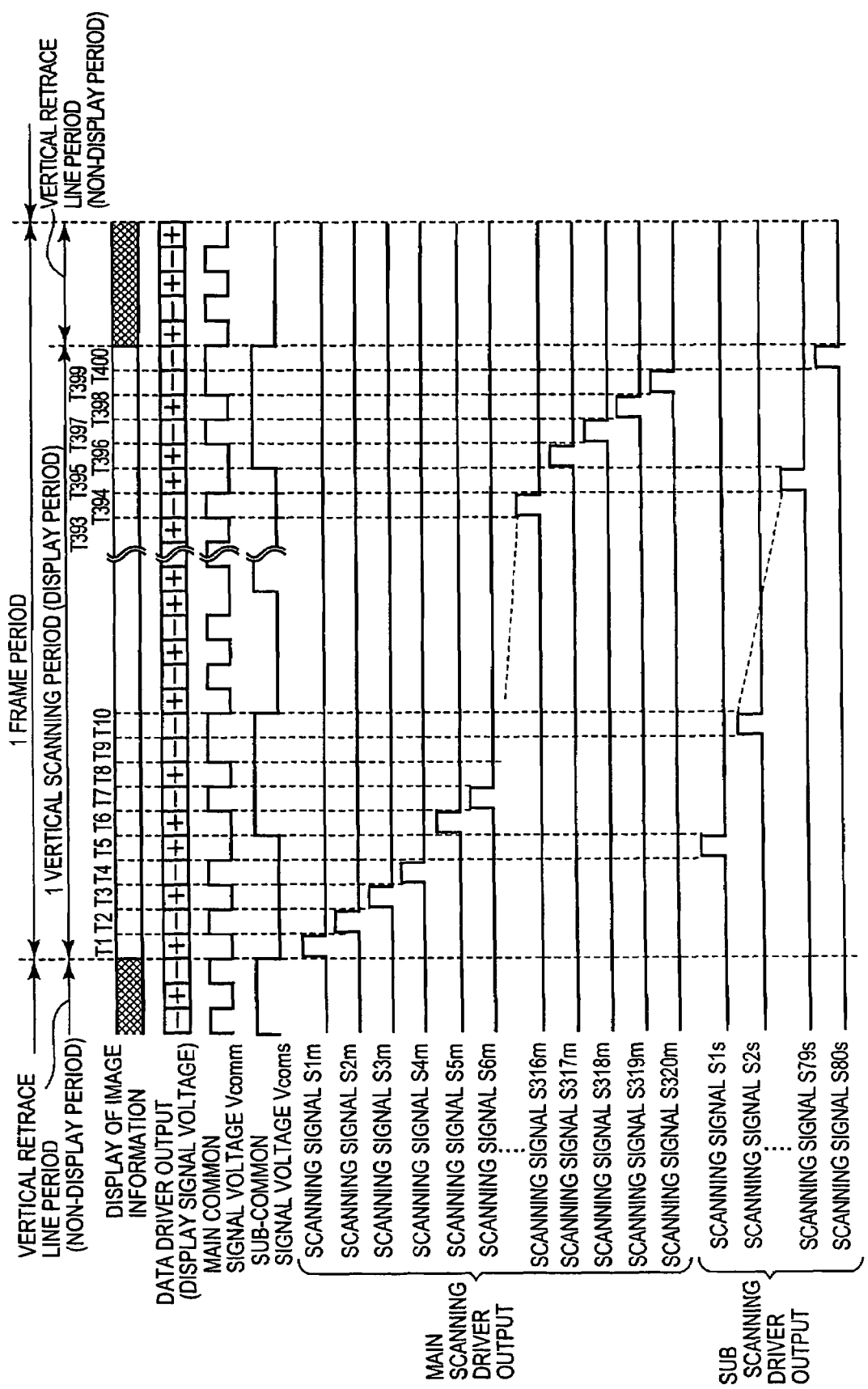
FIG. 5 is a timing chart showing the third embodiment of the drive control method in the liquid crystal display related to the present invention.

FIG. 5 is a timing chart showing the third embodiment of the drive control method in the liquid crystal display related to the present invention.

In addition, explanation is simplified or omitted in regard to control operations equivalent to the first and second embodiments mentioned above.

In this embodiment of the display device (refer to FIG. 1) which contains the configuration mentioned above, the number of scanning lines allocated in the main display panel 10$m$ is 320. The number of scanning lines allocated in the sub-display panel 10$s$ is 80. The panel size ratio (number of scanning lines) of the main display panel 10$m$ and the sub-display panel 10$s$ that will be explained is precisely 4:1.

The drive control method of the display device related to the embodiment, as seen in FIG. 5, depicts 1 vertical scanning period within a 1 frame period. At scan timing T1~T4, high-level scanning signals S1$m$~S4$m$ are sequentially applied relative to the 1$^{st}$ thru 4$^{th}$ rows of the scanning lines in the main display panel 10$m$. At this scan timing T1~T4, a predetermined luminance signal is sequentially written relative to the 1$^{st}$ thru 4$^{th}$ rows of the display pixels in the main display panel 10$m$ by sequentially applying display signal voltage relative to each of display pixels of the appropriate 1$^{st}$ thru 4$^{th}$ rows via each data line from the data driver 20.

Subsequently, at scan timing T5, a high-level scanning signal S1$s$ is applied relative to the 1$^{st}$ row scanning line of the sub-display panel 10$s$ from the sub-scan driver 30$s$. At this scan timing T5, a predetermined luminance signal is written relative to the 1$^{st}$ row of the display pixels in the sub-display panel 10$s$ by simultaneously applying display signal voltage relative to the appropriate 1$^{st}$ row of the display pixels via each data line from the data driver 20.

Hereinafter, after performing scanning drive for the 4$^{th}$ row of the scanning lines in the main display panel 10$m$, by alternately repeating execution of similar control operations until scan timing T400 which perform scanning drive for 1 row segments of the scanning lines in the sub-display panel 10$s$, the desired luminance signal (display signal voltage) is written and displayed as image information in both the main display panel 10$m$ which has 320 scanning lines and the sub-display panel 10$s$ which has 80 scanning lines in 1 vertical scanning period (display period) within a 1 frame period.

Also, in the drive control method mentioned above and as seen in FIG. 5, at scan timing T1~T4, T6~T9, T11~, . . . , as display signal voltage of positive polarity and negative polarity is alternately applied to the pixel electrodes for each row of display pixels in the main display panel 10$m$, low-level and high-level main common signal voltage Vcomm is alternately applied to the common electrode of the main display panel 10$m$ and line (row) reversal drive is performed in the main display panel 10$m$.

Also, at scan timing T5, T10, . . . , as display signal voltage of positive polarity and negative polarity is alternately applied to the pixel electrodes for each row of display pixels in the sub-display panel 10$s$, low-level and high-level sub-common signal voltage Vcoms is alternately applied to the common electrode of the sub-display panel 10$s$ and line (row) reversal drive is performed in the sub-display panel 10$s$.

Furthermore, a vertical retrace line period (non-display period) is set after conclusion of 1 vertical scanning period within a 1 frame period regarding the display signal voltage together with the main common signal voltage Vcomm and sub-common signal voltage Vcoms applied to each row of the display pixels (pixel electrodes and common electrode) in the main display panel 10$m$ and the sub-display panel 10$s$ in the above-mentioned 1 vertical scanning period. The period (for example, period of 5 phase segments in FIG. 5) of duration allocated for odd-numbered segments is identical for each of the above mentioned scan timing T1~T400. In these vertical retrace line periods the odd-numbered reversals of the main common signal voltage Vcomm and sub-common signal voltage Vcoms are performed. For example, as seen in FIG. 5, the main common signal voltage Vcomm is reversed 5 times and the sub-common signal voltage Vcoms is reversed 1 time. Accordingly, the signal polarity of each signal voltage in the next 1 frame period is reversed and frame reversal drive is performed in the main display panel 10$m$ and the sub-display panel 10$s$.

Moreover, for example as shown in FIG. 5, when performing scanning drive in the sub-display panel 10$s$, the signal polarity of the main common signal voltage Vcomm in the main display panel 10$m$ side is set to the same polarity as the signal polarity of the sub-common signal voltage Vcoms in the sub-display panel 10$s$. Also, when performing scanning drive in the main display panel 10$m$, the signal polarity of the sub-common signal voltage Vcoms in the sub-display panel 10$s$ side is set to the same polarity as the signal polarity of the sub-common signal voltage Vcoms in the sub-display panel 10$s$ for the following scanning drive occurrence. Accordingly, in 1 vertical scanning period, the reversal drive frequency of the main common signal voltage Vcomm applied to the main display panel 10$m$ is the same total as the number of scanning lines in the main display panel 10$m$. The reversal drive frequency of the sub-common signal voltage Vcoms applied to the sub-display panel 10$s$ is the same total as the number of scanning lines in the sub-display panel 10$s$.

Consequently, even in the case where the panel size ratio (number of scanning lines) of the main display panel and the sub-display panel is established as 4:1, similar to the first and second embodiments mentioned above in which the common signal voltage is individually applied to the main display panel and the sub-display panel, this method simply necessitates reversal drive for only the frequency corresponding to the number of scanning lines allocated in the main display panel or the sub-display panel, respectively. In this manner, while being able to reduce the driving cycles (frequency rate of repetition) related to the reversal drive to achieve a reduction in power consumption, line reversal drive and frame reversal drive in the main display and the sub-display can be accomplished. Therefore, degeneration and seizing of the liquid crystal molecules in the display pixel configuration which results in deterioration of the display image quality by a flickering problem, device malfunction, etc. can be more precisely controlled.

4th Embodiment

Next, the fourth embodiment of the drive control operation of the display device which has the configuration mentioned above will be briefly explained with reference to the drawings.

Figure 6:
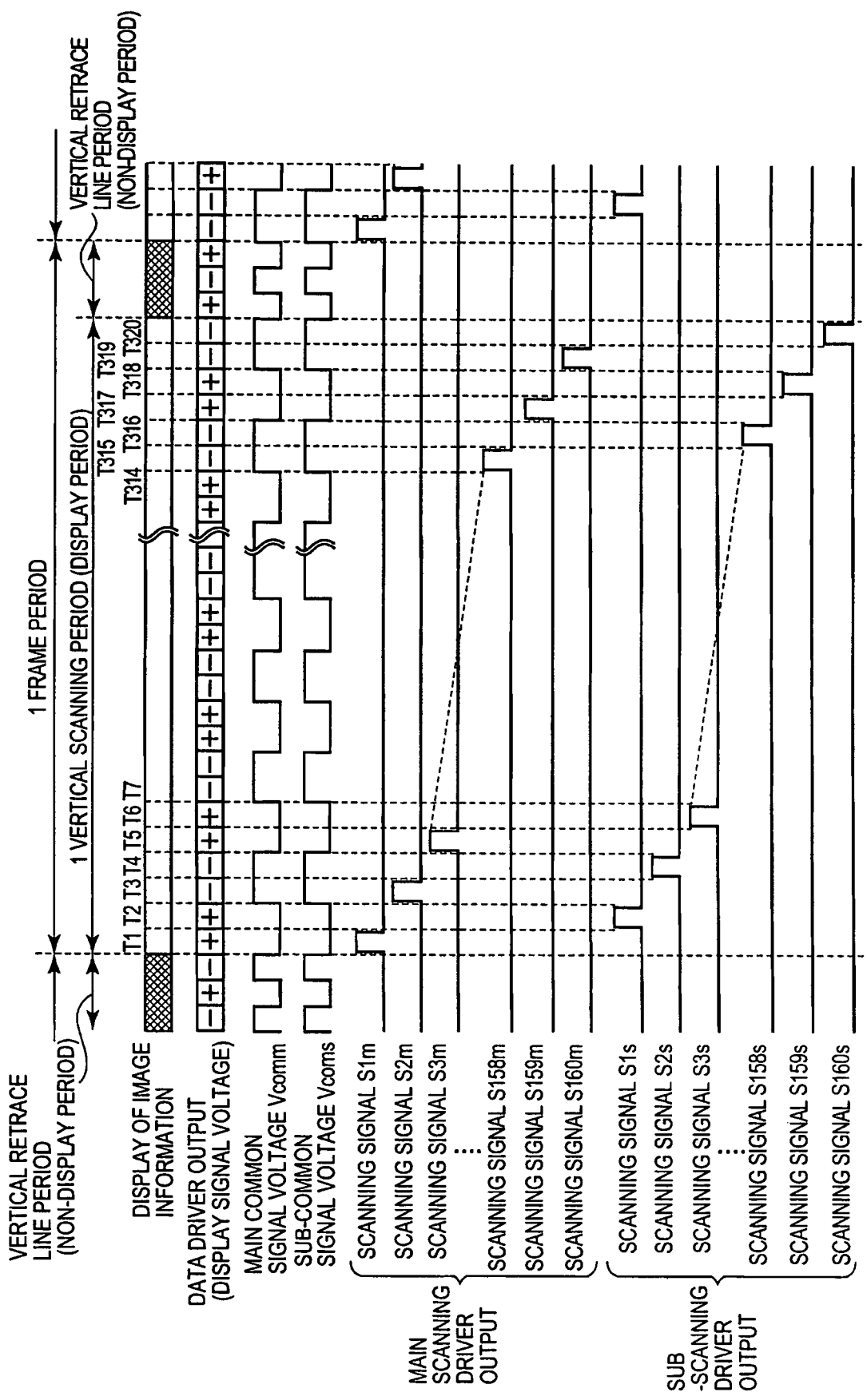
FIG. 6 is a timing chart showing the fourth embodiment of the drive control method in the liquid crystal display related to the present invention.

FIG. 6 is a timing chart showing the fourth embodiment of the drive control method in the liquid crystal display related to the present invention.

In addition, explanation is simplified or omitted in regard to control operations equivalent to the first thru third embodiments mentioned above.

In this embodiment of the display device (refer to FIG. 1) which contains the configuration mentioned above, the number of scanning lines allocated in the main display panel 10$m$ is 160. The number of scanning lines allocated in the sub-display panel 10$s$ is 160. The panel size ratio (number of scanning lines) of the main display panel 10$m$ and the sub-display panel 10$s$ will be explained is precisely 1:1.

The drive control method of the display device related to the embodiment, as seen in FIG. 6, depicts 1 vertical scanning period within a 1 frame period. At scan timing T1, T3, T5, . . . , high-level scanning signals S1$m$, S2$m$, S3$m$, . . are sequentially applied relative to the $1^{st}$, $2^{nd}$, $3^{rd}$, . . . rows of each scanning line in the main display panel 10$m$ from the main scan driver 30$m$. Also, at scan timing T2, T4, T6, . . . , high-level scanning signals S1$s$, S2$s$, S3$s$, . . . are sequentially applied relative to the $1^{st}$, $2^{nd}$, $3^{rd}$, . . . rows of each scanning line in the sub-display panel 10$s$ from the sub-scan driver 30$s$.

Here, during scan timing T1, T3, T5, . . . , a predetermined luminance signal is sequentially written relative to each row of the main display panel 10$m$ by simultaneously applying display signal voltage relative to each of the display pixels for the $1^{st}$, $2^{nd}$, $3^{rd}$, . . . rows in the main display panel 10$m$ via each data line from the data driver 20. During scan timing T2, T4, T6, . . . , a predetermined luminance signal is sequentially written relative to each row of the sub-display panel 10$s$ by simultaneously applying display signal voltage relative to each of the display pixels for the $1^{st}$, $2^{nd}$, $3^{rd}$, . . . rows in the sub-display panel 10$s$ via each data line from the data driver 20.

Accordingly, the desired luminance signal (display signal voltage) is sequentially written and displayed as image information in both the main display panel 10$m$ and the sub-display panel 10$s$ which have 160 scanning lines, respectively, in 1 vertical scanning period (display period) within a 1 frame period.

Additionally, as seen in FIG. 6, in the drive control operation described above, at scan timing T1, T3, T5, . . . , as display signal voltage of positive polarity and negative polarity is alternately applied to the pixel electrodes for each row of display pixels in the main display panel 10$m$, low-level and high-level main common signal voltage Vcomm is alternately applied to the common electrode of the main display panel 10$m$ and line (row) reversal drive is performed. Also, at scan timing T2, T4, T6, . . . , as display signal voltage of positive polarity and negative polarity is alternately applied to the pixel electrodes for each row of display pixels in the sub-display panel 10$s$, low-level and high-level sub-common signal voltage Vcoms is alternately applied to the common electrode of the sub-display panel 10$s$ and line (row) reversal drive is performed.

Furthermore, a vertical retrace line period (non-display period) is set after conclusion of 1 vertical scanning period within a 1 frame period regarding the display signal voltage together with the main common signal voltage Vcomm and sub-common signal voltage Vcoms applied to each row of the display pixels (pixel electrodes and common electrode) in the main display panel 10$m$ and the sub-display panel 10$s$ in the above-mentioned 1 vertical scanning period. The period (for example, period of 3 phase segments in FIG. 6) of duration allocated for odd-numbered segments is identical for each of the above mentioned scan timing T1~T320. In these vertical retrace line periods, the odd-numbered reversals of the main common signal voltage Vcomm and sub-common signal voltage Vcoms are performed. For example, as seen in FIG. 6, both the main common signal voltage Vcomm and the sub-common signal voltage Vcoms are reversed 3 times. Accordingly, the signal polarity of each signal voltage in the next 1 frame period is reversed and frame reversal drive is performed in the main display panel 10$m$ and the sub-display panel 10$s$.

Moreover, for example as shown in FIG. 6, when performing scanning drive in the sub-display panel 10$s$, the signal polarity of the main common signal voltage Vcomm in the main display panel 10$m$ side is set to the same polarity as the signal polarity of the sub-common signal voltage Vcoms in the sub-display panel 10$s$. Also, when performing scanning drive in the main display panel 10$m$, the signal polarity of the sub-common signal voltage Vcoms in the sub-display panel 10$s$ side is set to the same polarity as the signal polarity of the sub-common signal voltage Vcoms in the sub-display panel 10$s$ for the following scanning drive occurrence. Accordingly, in 1 vertical scanning period, the reversal drive frequency of the main common signal voltage Vcomm applied to the main display panel 10$m$ is the same total as the number of scanning lines in the main display panel 10$m$. The reversal drive frequency of the sub-common signal voltage Vcoms applied to the sub-display panel 10$s$ is the same total as the number of scanning lines in the sub-display panel 10$s$.

Particularly, such as this embodiment when the panel size ratio (number of scanning lines) of the main display panel 10$m$ and the sub-display panel 10$s$ is set as 1:1, as shown in FIG. 6, the reversal drive of the main common voltage Vcomm applied to the main display panel 10$m$ and sub-common signal voltage Vcoms applied to the sub-display panel 10$s$ is performed in the same cycle. As a result, for example, a configuration which interchanges the main common electrode driver circuit 60$m$ and the sub-common driver circuit 60$s$ with a single common electrode driver circuit is applicable. Accordingly, the circuit configuration of the display device can be simplified and miniaturized.

Additionally, even if it is a case where the panel size (number of scanning lines) of the main display panel and sub-display panel is set as 1:1, as described in each of the above-described embodiments, because reversal drive of the common signal voltage is applied to the main display panel and the sub-display panel and performed for only the number of scanning lines allocated in the main display panel or the sub-display panel, the reversal drive of the common signal voltage can be applied to the main display panel and the sub-display panel. Thus, the driving cycles (frequency rate of repetition) related to the reversal drive can be decreased and a reduction in power consumption can be achieved.

In each of the embodiments above, although explained that the panel size ratio (number of scanning lines) of the two display panels is defined as n:1 (n=1~4), the present invention is not restricted to this. Specifically, the present invention is an apparatus which applies a scanning signal relative to a scanning line group situated in each of two display panels at timing corresponding to the panel size ratio (number of scanning lines) of each display panel. For example, even in the case where the panel size ratio of the two display panels constitutes a relational quantity of i: j (i, j>1, 1-digit positive integers), this proportion is favorably applicable as well.

For example, when the panel size ratio (number of scanning lines) of two display panels has the relation of 3:2 in the drive control method described above, after sequentially applying a scanning signal and performing scanning drive relative to 3 row segments (for example, main display panel $10m$ for the $1^{st}$ thru $3^{rd}$ rows; i-th rows) of the scanning lines in one display panel at consecutive scan timing (3 scan timing), a scanning signal is sequentially applied and scanning drive performed relative to 2 row segments (for example, sub-display panel $10s$ for the $1^{st}$ and $2^{nd}$ rows; j-th rows) of the scanning lines in the second display panel by the following consecutive scan timing (2 scan timing). This control operation which executes scanning drive is alternately repeated between both display panels. As in the case of each embodiment explained above, the reversal drive frequency (rate of repetition) of the common signal voltage applied to each display panel is the same total as the number of scanning lines in each display panel. While being able to reduce the driving cycles (frequency) related to the reversal drive to achieve a reduction in power consumption, line reversal drive and frame reversal drive can be accomplished.

In addition, mentioned above is a case in which the panel size ratio of the two display panels does not constitute a simpler integer ratio. In this instance, operation timing is regulated with a 1 frame period. Specifically, a dummy scanning interval is provided which adjusts timing so that the sum total time for each signal polarity becomes the same for each common signal voltage in each display panel and an approximated integer ratio i: j proportionate to the panel size ratio is employed. As stated above, the operation then alternately repeats scanning drive between each of the display panels by the number of scanning lines relative to the panel size ratio of both display panels. Like the drive control method mentioned above, while being able to reduce the driving cycles (frequency) related to the reversal drive achieves a reduction in power consumption, line reversal drive and frame reversal drive can be accomplished.

Furthermore, as for the first through third embodiments mentioned above, the display device comprises a main display panel which includes a relatively large panel size (greater number of scanning lines) and a sub-display panel with a comparatively smaller panel size (lesser number of scanning lines). Besides, although a case is explained in which j-th row scanning drive in the sub-display panel is performed after i-th row scanning drive in the main display panel, the possibility is stressed that the electronic apparatus may perform operational control so that i-th row scanning drive in the main display panel is performed after j-th row scanning drive in the sub-display panel.

Finally, although the embodiments mentioned above only described cases comprising two display panels, the present invention may be a display device which is not limited to this and comprised with a greater number of display panels of 3 or more than 3. Also, in this case the technical concept of the present invention can be applied by sequentially repeating scanning drive between each of the display panels by the number of scanning lines relative to the panel size ratio of each display panel. Again, like the drive control method mentioned above, while being able to reduce the driving cycles (frequency) related to the reversal drive to achieve a reduction in power consumption, line reversal drive and frame reversal drive can be accomplished.

While the present invention has been described with reference to the preferred embodiments, it is intended that the invention be not limited by any of the details of the description therein but includes all the embodiments which fall within the scope of the appended claims.

What is claimed is:

1. A display device that displays an image corresponding to a display signal, the display device comprising:
    a first display panel having display pixels and a first common electrode that is set to a common electric potential for each display pixel, each display pixel being situated near an intersecting point of a scanning line and a signal line;
    a second display panel having display pixels and a second common electrode that is set to a common electric potential for each display pixel and is separated from the first common electrode, each display pixel being situated near an intersecting point of a scanning line and a signal line;
    a scan driver section that, in each image frame, sets each scanning line of the first display panel in a selected state in a predetermined sequence and sets each scanning line of the second display panel in the selected state in a predetermined sequence;
    a first common electrode driver section that applies either of two different voltage levels to the first common electrode;
    a second common electrode driver section that applies either of two different voltage levels to the second common electrode; and
    a control section which controls the scan driver section so that a display panel in which a scanning line is set in the selected state switches between the first display panel and the second display panel a plurality of times within one frame, and which controls the second common electrode driver section so that a voltage level applied to the second common electrode switches at a predetermined timing whenever any of the scanning lines of the second display panel is set in the selected state and so that a voltage level that is switched at the predetermined timing is maintained on the second common electrode until a next time of the predetermined timing;
    wherein the control section controls the first common electrode driver section so that a voltage level applied to the first common electrode switches based on a switch timing of the scanning lines selected in the first display panel and a switch timing of the voltage level applied to the second common electrode, and so that in each frame cumulative application times of the two different voltage levels to the first common electrode are equal.

2. The display device according to claim 1, wherein the control section controls the first common electrode driver section and the second common electrode driver section so that the voltage level applied to the first common electrode and the second common electrode are reversed each frame.

3. The display device according to claim 2, wherein each frame comprises a non-display period for timing adjustment in order to reverse the voltage level applied to the first common electrode and the second common electrode for the frame.

4. The display device according to claim 1, wherein the control section controls the scan driver section so that the display panel in which a scanning line is set in the selected state switches between the first display panel and the second display panel a number of times within one frame that is equal to a number of the scanning lines of the second display panel.

5. The display device according to claim 1, wherein the signal lines of the first display panel and the signal lines of the second display panel are connected.

6. The display device according to claim 1, wherein the scan driver section comprises a first scan driver section corresponding to the first display panel and a second scan driver section corresponding to the second display panel.

7. The display device according to claim 1, wherein a ratio of a number of the scanning lines of the first display panel to a number of the scanning lines of the second display panel is i:j (i, j are single digit positive integers), and the control section controls the scan driver section to sequentially set i scan line(s) of the first display panel in the selected state and then to sequentially set j scan line(s) of the second display panel in the selected state.

8. The display device according to claim 1, wherein the control section controls the scan driver section so that the display panel in which a scanning line is set in the selected state switches between the first display panel and the second display panel only a number of times within one frame in proportion to a number of scanning lines of the first display panel and a number of scanning lines of the second display panel.

9. The display device according to claim 1, wherein a ratio of a number of the scanning lines of the first display panel to a number of the scanning lines of the second display panel is i:j (i, j are single digit positive integers), and the control section controls the scan driver section to sequentially set j scan line(s) of the second display panel in the selected state and then to sequentially set i scan line(s) of the first display panel in the selected state.

10. The display device according to claim 1, wherein each frame has a display period and a non-display period and the control section controls the scan driver section so that all of the scanning lines are set in the selected state only in the display period.

11. The display device according to claim 1, wherein each frame has a display period and a non-display period, and the control section controls the scan driver section so that all of the scanning lines are set in a non-seclected state in the non-display period.

12. The display device according to claim 11, wherein the control section controls the first common electrode driver section so that, in the display period, cumulative application times of the two different voltage levels to the first common electrode are equal.

13. The display device according to claim 11, wherein the display period is a vertical scanning period required for setting all of the scanning lines of each of the display panels in the selected state.

14. An electronic apparatus comprising a display device that displays an image corresponding to a display signal, the display device comprising:

a first display panel having display pixels and a first common electrode that is set to a common electric potential for each display pixel, each display pixel being situated near an intersecting point of a scanning line and a signal line;

a second display panel having display pixels and a second common electrode that is set to a common electric potential for each display pixel and is separated from the first common electrode, each display pixel being situated near an intersecting point of a scanning line and a signal line;

a scan driver section that, in each image frame, sets each scanning line of the first display panel in a selected state in a predetermined sequence and sets each scanning line of the second display panel in the selected state in a predetermined sequence;

a first common electrode driver section that applies either of two different voltage levels to the first common electrode;

a second common electrode driver section that applies either of two different voltage levels to the second common electrode; and a control section which controls the scan driver section so that a display panel in which a scanning line is set in the selected state switches between the first display panel and the second display panel a plurality of times within one frame, and which controls the second common electrode driver section so that a voltage level applied to the second common electrode switches at a predetermined timing whenever any of the scanning lines of the second display panel is set in the selected state and so that a voltage level that is switched at the predetermined timing is maintained on the second common electrode until a next time of the predetermined timing;

wherein the control section controls the first common electrode driver section so that in each frame cumulative application times of the two different voltage levels to the first common electrode are equal.

15. The electronic apparatus according to claim 14, wherein the electronic apparatus comprises a cellular telephone.

16. The electronic apparatus according to claim 14, wherein the control section controls the first common electrode driver section and the second common electrode driver section so that a voltage level applied to the first common electrode and the second common electrode are reversed each frame.

17. The electronic apparatus according to claim 16, wherein each frame comprises a non-display period for timing adjustment in order to reverse the voltage level applied to the first common electrode and the second common electrode for the frame.

18. The electronic apparatus according to claim 14, wherein the control section controls the scan driver section so that the display panel in which a scanning line is set in the selected state switches between the first display panel and the second display panel a number of times within one frame that is equal to a number of the scanning lines of the second display panel.

19. The electronic apparatus according to claim 14, wherein the signal lines of the first display panel and the signal lines of the second display panel are connected.

20. The electronic apparatus according to claim 14, wherein the scan driver section comprises a first scan driver section corresponding to the first display panel and a second scan driver section corresponding to the second display panel.

21. The electronic apparatus according to claim 14, wherein a ratio of a number of the scanning lines of the first display panel to a number of the scanning lines of the second display panel is i:j (i, j are single digit positive integers), and the control section controls the scan driver section to sequentially set i scan line(s) of the first display panel in the selected state and then to sequentially set j scan line(s) of the second display panel in the selected state.

22. The electronic apparatus according to claim 14, wherein the control section controls the scan driver section so that the display panel in which a scanning line is set in the selected state switches between the first display panel and the second display panel only a number of times within one frame in proportion to a number of scanning lines of the first display panel and a number of scanning lines of the second display panel.

23. The electronic apparatus according to claim 14, wherein the control section controls the first common electrode driver section so that a voltage level applied to the first common electrode switches based on a switch timing of the scanning lines selected in the first display panel and a switch timing of the voltage level applied to the second common electrode.

24. The electronic apparatus according to claim 14, wherein a ratio of a number of the scanning lines of the first display panel to a number of the scanning lines of the second display panel is i:j (i, j are single digit positive integers), and the control section controls the scan driver section to sequentially set j scan line(s) of the second display panel in the selected state and then to sequentially set i scan line(s) of the first display panel in the selected state.

25. The electronic apparatus according to claim 14, wherein each frame has a display period and a non-display period and the control section controls the scan driver section so that all of the scanning lines are set in the selected state only in the display period.

26. The electronic apparatus according to claim 14, wherein each frame has a display period and a non-display period and the control section controls the scan driver section so that all of the scanning lines are set in a non-selected state in the non-display period.

27. An electronic apparatus, comprising a display device that displays an image corresponding to a display signal, the display device comprising:
  a first display panel having display pixels and a first common electrode that is set to a common electric potential for each display pixel, each display pixel being situated near an intersecting point of a scanning line and a signal line;
  a second display panel having display pixels and a second common electrode that is set to a common electric potential for each display pixel and is separated from the first common electrode, each display pixel being situated near an intersecting point of a scanning line and a signal line;
  a scan driver section that, in each image frame, sets each scanning line of the first display panel in a selected state in a predetermined sequence and sets each scanning line of the second display panel in the selected state in a predetermined sequence;
  a first common electrode driver section that applies either of two different voltage levels to the first common electrode;
  a second common electrode driver section that applies either of two different voltage levels to the second common electrode; and
  a control section which controls the scan driver section so that a display panel in which a scanning line is set in the selected state switches between the first display panel and the second display panel a plurality of times within one frame, and which controls the second common electrode driver section so that a voltage level applied to the second common electrode switches at a predetermined timing whenever any of the scanning lines of the second display panel is set in the selected state and so that a voltage level that is switched at the predetermined timing is maintained on the second common electrode until a next time of the predetermined timing;
  wherein each frame has a display period and a non-display period and the control section controls the scan driver section so that all of the scanning lines are set in a non-selected state in the non-display period; and
  wherein the control section controls the first common electrode driver section so that, in the display period, cumulative application times of the two different voltage levels to the first common electrode are equal.

28. A drive control method for a display device comprising a first display panel having display pixels and a first common electrode that is set to a common electric potential for each display pixel, each display pixel being situated near an intersecting point of a scanning line and a signal line, and a second display panel having display pixels and a second common electrode that is set to a common electric potential for each display pixel and is separated from the first common electrode, each display pixel being situated near an intersecting point of a scanning line and a signal line, a ratio of a number of the scanning lines of the first display panel to a number of the scanning lines of the second display panel being i:j (i, j are single digit positive integers), the method comprising:
  a) sequentially setting j scan line(s) of the second display panel in a selected state;
  b) sequentially setting i scan line(s) of the first display panel in the selected state;
  c) repeating steps a) and b);
  d) switching a voltage level applied to the second common electrode at a predetermined timing whenever any of the scanning lines of the second display panel is set in the selected state and maintaining a voltage level that is switched at the predetermined timing on the second common electrode until a next time of the predetermined timing; and
  e) switching, between two different voltage levels, a voltage level applied to the first common electrode based on a switch timing of the scanning lines selected in the first display panel and a switch timing of the voltage level applied to the second common electrode, wherein in each image frame cumulative application times of the two different voltage levels to the first common electrode are equal.

29. The drive control method according to claim 28, further comprising reversing a voltage level applied to the first common electrode and the voltage level applied to the second common electrode each image frame.

* * * * *